(12) United States Patent
Chang et al.

(10) Patent No.: US 10,061,759 B2
(45) Date of Patent: Aug. 28, 2018

(54) PROGRESSIVE LOADING FOR WEB-BASED SPREADSHEET APPLICATIONS

(75) Inventors: Ming-Hsiung Chang, New Taipei (TW); Shao-Yi Hung, Taipei (TW); Peng-Jen Chen, New Taipei (TW); Li-Hui Chen, Taipei (TW); Hung-Ju King, New Taipei (TW); Hsin Hui Huang, Taipei (TW)

(73) Assignee: Microsoft Technology Licensing, LLC, Redmond, WA (US)

( * ) Notice: Subject to any disclaimer, the term of this patent is extended or adjusted under 35 U.S.C. 154(b) by 785 days.

(21) Appl. No.: 13/490,481

(22) Filed: Jun. 7, 2012

(65) Prior Publication Data

US 2013/0332811 A1 Dec. 12, 2013

(51) Int. Cl.
*G06F 17/00* (2006.01)
*G06F 17/24* (2006.01)

(52) U.S. Cl.
CPC .................. *G06F 17/246* (2013.01)

(58) Field of Classification Search
CPC ................................. G06F 17/30905
USPC .......... 715/212–217, 799, 863, 864
See application file for complete search history.

(56) References Cited

U.S. PATENT DOCUMENTS

| | | | |
|---|---|---|---|
| 7,103,851 B1 | 9/2006 | Jaeger | |
| 8,539,339 B2 * | 9/2013 | Lloyd et al. | 715/234 |
| 2006/0026521 A1 | 2/2006 | Hotelling et al. | |
| 2007/0294333 A1 * | 12/2007 | Yang et al. | 709/203 |
| 2009/0006978 A1 | 1/2009 | Swift et al. | |
| 2009/0089448 A1 * | 4/2009 | Sze et al. | 709/231 |
| 2010/0110025 A1 * | 5/2010 | Lim | 345/173 |
| 2010/0169766 A1 | 7/2010 | Duarte et al. | |
| 2010/0205520 A1 * | 8/2010 | Parish et al. | 715/212 |
| 2011/0087992 A1 | 4/2011 | Wang et al. | |
| 2011/0202834 A1 | 8/2011 | Mandryk et al. | |

(Continued)

FOREIGN PATENT DOCUMENTS

WO 2011104747 A1 9/2011

OTHER PUBLICATIONS

Sieber Tina, How to Manually & Automatically Clear Your Browser History, Published Apr. 11, 2012, pp. 1-7 (pdf).*

(Continued)

*Primary Examiner* — Manglesh M Patel
(74) *Attorney, Agent, or Firm* — Schwegman Lundberg & Woessner, P.A.

(57) ABSTRACT

Concepts and technologies are described herein for progressive loading for web-based spreadsheet applications. In accordance with the concepts and technologies disclosed herein, a user device can access data from a remote source such as a server computer. The user device can determine dimensions of a viewport corresponding to a viewable portion of the data, a window associated with the viewport, and a preloaded area associated with the window. The user device can request the data associated with the window and the preloaded area and store the data in a cache associated with the user device. The cached data can be used by the user device to generate UIs for displaying the spreadsheet. If the user device detects movement of the viewport, the user device can render a new UI in response to the movement. The user device also can be configured to update and/or clean the cache.

21 Claims, 11 Drawing Sheets

(56) References Cited

U.S. PATENT DOCUMENTS

2011/0252300 A1* 10/2011 Lloyd .................. G06F 17/24
                                                    715/217
2011/0264663 A1   10/2011 Verkasalo
2011/0307772 A1* 12/2011 Lloyd et al. .................. 715/212
2012/0005630 A1    1/2012 Ohba et al.
2012/0293559 A1   11/2012 Tomaru et al.
2014/0089774 A1*  3/2014 Lloyd .................. G06F 17/24
                                                    715/217

OTHER PUBLICATIONS

"iSpreadsheet Free (Mobile Spreadsheet)," www.savysoda.com, Retrieved at <<http://www.appstorehq.com/ispreadsheetfree-mobilespreadsheet--iphone-12148/app>>, Retrieved Date: Mar. 12, 2012, pp. 10.

"Documents to Go for iPhone/iPad/iPod Touch Help," Retrieved at <<http://www.dataviz.com/handheld/support/documentstogo/iphone/#_Navigating_a_Spreadsheet>>, Retrieved Date: Mar. 12, 2012, pp. 21.

"Read your Office Documents on the OlivePad", Retrieved at <<http://www.olivetelecom.in/laptop/olivepad/office-documents.html>>, Retrieved Date: Mar. 12, 2012, pp. 2.

Hollington, Jesse, "iPhone + iPad Gems: Quickoffice / Pro / HD, Documents to Go, Office2 + HD," Sep. 9, 2011, Retrieved at <<http://www.ilounge.com/index.php/articles/comments/iphone-ipad-gems-quickoffice-pro-hd-documents-to-go-office2-hd/>>, pp. 21.

"YUI 2: Get Utility," Retrieved at <<http://developer.yahoo.com/yui/get/>>, Retrieved Date: Mar. 12, 2012, pp. 5.

"krpano XML Reference for version 1.0.8.14," Retrieved at <<http://krpano.com/docu/xml/>>, Retrieved Date: Mar. 12, 2012, pp. 55.

\* cited by examiner

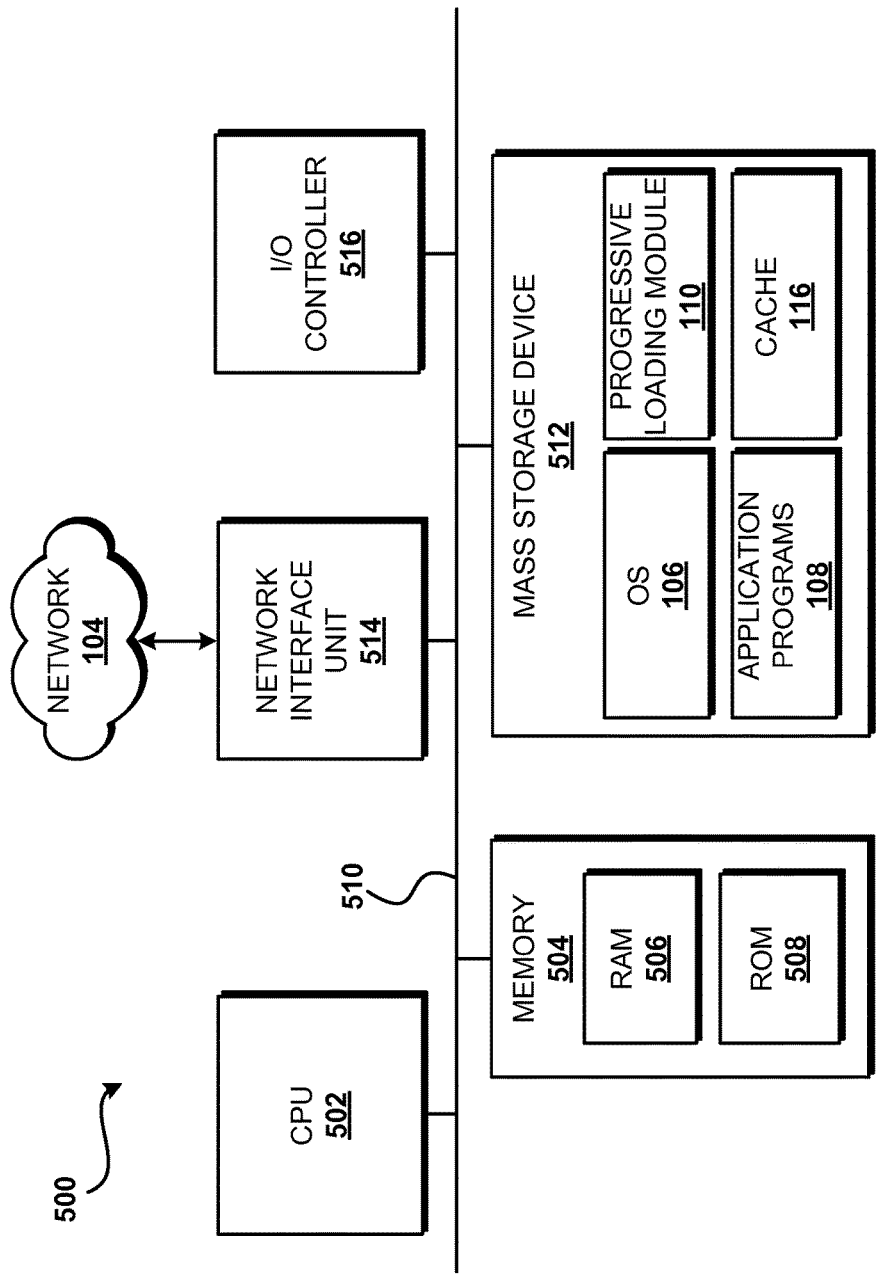

PROGRESSIVE LOADING FOR WEB-BASED SPREADSHEET APPLICATIONS

BACKGROUND

Spreadsheet files are sometimes used to store, edit, view, and/or share data in a table-based and/or grid-based layout. Generally, spreadsheet files include a number of cells arranged into any number of columns or rows. Traditionally, users installed natively-executed spreadsheet applications to create, edit, and/or view spreadsheet files. These applications often have been optimized for a particular computing platform such as a desktop computer, a smartphone, or the like. Thus, these applications also may be optimized for a particular input device such as a keyboard or mouse.

With the increasing popularity of mobile applications, various applications that typically were reserved for desktop or laptop computers have been moved to web applications. Thus, users today sometimes interact with world wide web ("web") based spreadsheet applications in addition to, or instead of, traditional natively-executed spreadsheet applications. In a web-based spreadsheet application, spreadsheet files can be represented by hypertext markup language ("HTML") code, extensible markup language ("XML") code, and/or code in other formats. Various scripts or other types of code can be used to implement user manipulation of the spreadsheet files. Web-based spreadsheet applications can allow users to create, save, modify, access, and/or share spreadsheet files across various platforms and/or locations.

Performance of web-based spreadsheet applications, however, may be affected by connection speed and/or bandwidth. In particular, the data corresponding to the spreadsheet may be downloaded to a device from a remote server. To reduce the amount of network traffic, users may download only a portion of the spreadsheet at a time and may download additional data when an updated display screen relies upon that data. Depending upon an available connection speed and/or available bandwidth, downloading this data on demand can adversely affect the user experience. Thus, movements within the spreadsheet can affect the user experience and can adversely affect users' willingness to use the web-based spreadsheet application.

It is with respect to these and other considerations that the disclosure made herein is presented.

SUMMARY

Concepts and technologies are described herein for progressive loading for web-based spreadsheet applications. In accordance with the concepts and technologies disclosed herein, a user device is configured to access data corresponding to a spreadsheet. When a request for the data is detected at the user device, the user device can determine, via execution of a pre-loader or other functionality, dimensions of a viewport. As used herein, the term "viewport" can refer to an area or display space on which the spreadsheet is to be displayed. In addition to the viewport, the user device can define a window around the viewport. As used herein, a "window" can refer to a buffer or area around the viewport that corresponds to an area into which movement and/or navigation from the viewport is expected or likely.

The user device can request the data from the server computer. The received data can be stored in a cache at the user device and used to generate a user interface ("UI") for displaying the spreadsheet. In some embodiments, data in cells adjacent to the window (referred to herein as the "preloaded area") also is downloaded and stored in the cache. As such, the user device can render new UIs in response to movements into areas adjacent to the viewport and/or window. The rendering of the new UIs can be accomplished in real time without accessing the data stored at the server computer. The user device can update the cache after, during, or before rendering the updated view by accessing the server computer.

According to one aspect, a user device executes application programs, a gridview module, and a pre-loader. The gridview module can be configured to identify a viewport and window at runtime and/or at other times. The pre-loader can be configured to identify the preloaded area that is adjacent to the window. The gridview module also can be configured to request the data corresponding to the viewport and/or window, and the pre-loader can be configured to request the data corresponding to the preloaded area. Upon receiving the data, the data corresponding to the preloaded area can be stored in a cache, and the data corresponding to the viewport and/or window can be retrieved from the cache and used to generate a UI for presenting the viewport.

According to another aspect, if a movement of the viewport is detected at the user device, the user device can determine if data associated with the moved viewport and/or window exists in the cache. If the data exists in the cache, the user device can generate a UI for the moved viewport and/or window and data associated with the preloaded area, the location of which can move in conjunction with movement of the viewport, can be downloaded and cached by the user device. If the data does not exist in the cache, the user device can access the server computer and download the data.

According to another aspect, the user device can be configured to clean the cache. The cache cleaning can be executed to clean the cache of unnecessary data. In some embodiments, the cache cleaning is accomplished by erasing the oldest data first, though other cache cleaning schemes are contemplated. Thus, the user device can maintain an updated cache and can move data from the cache into the window to generate views of the data in response to movements of the viewport.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 is a computer architecture diagram illustrating an illustrative computer hardware and software architecture for a computing system capable of implementing aspects of the embodiments presented herein.

DETAILED DESCRIPTION

Figure 1:
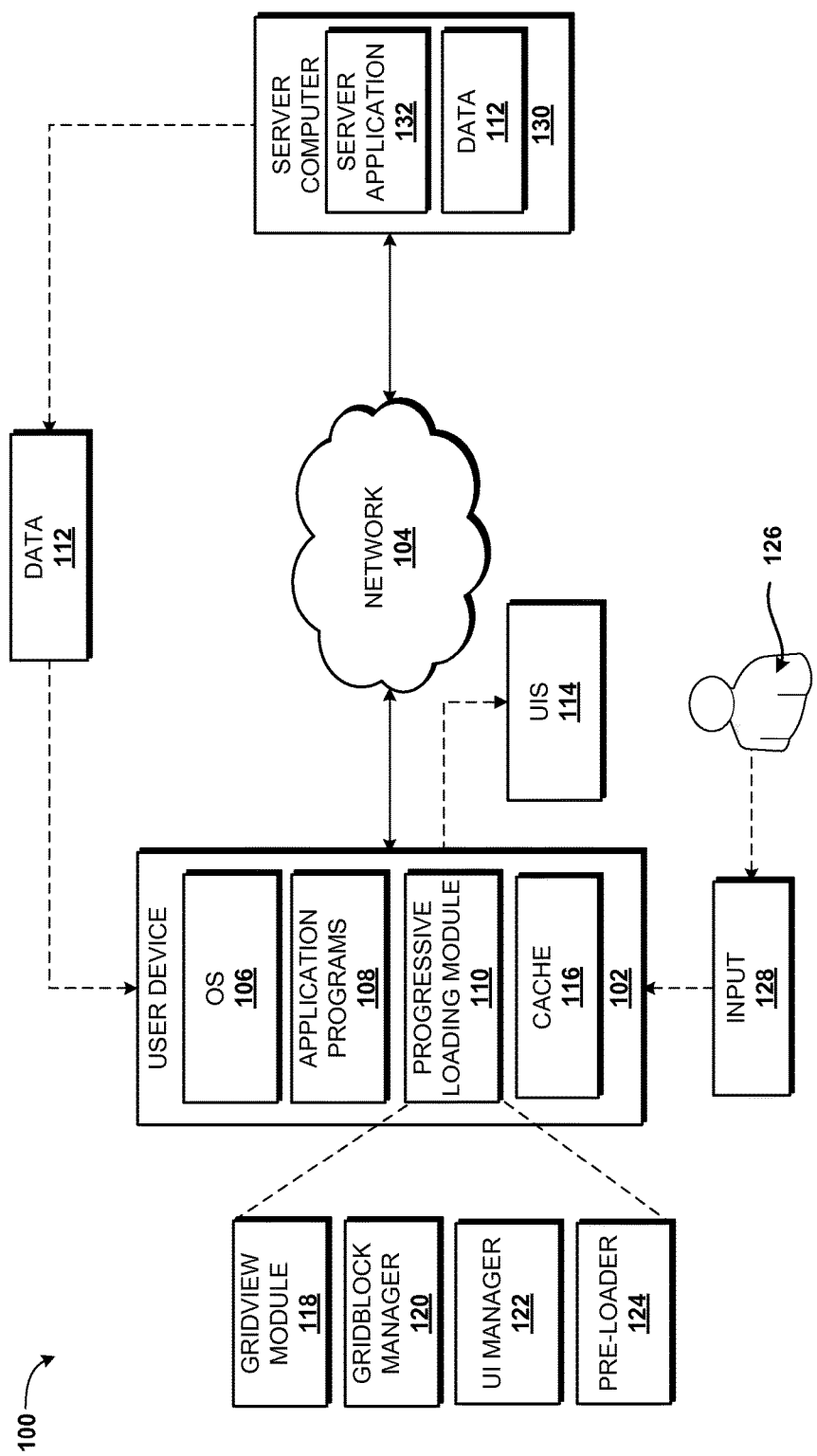
FIG. 1 is a system diagram illustrating an illustrative operating environment for the various embodiments disclosed herein.

The following detailed description is directed to concepts and technologies for progressive loading for web-based spreadsheet applications. According to the concepts and technologies described herein, a user device is configured to access data corresponding to a spreadsheet. When a request for the data is detected at the user device, the user device can determine, via execution of a pre-loader or other functionality, dimensions of a viewport, a window associated with the viewport, and a preloaded area associated with the window. The user device can request the data associated with the window and the preloaded area from the server computer. In some embodiments, the user device requests a range of cells corresponding to the window and the preloaded area from the server computer.

The received data can be stored in a cache at the user device. The cached data can be used by the user device to generate a user interface ("UI") for displaying the spreadsheet. The user device can render new UIs in response to movements into areas adjacent to the viewport and/or window. The rendering of the new UIs can be accomplished without first accessing the data stored at the server computer. The user device can update the cache after, during, or before rendering the updated view by accessing the server computer. The user device also can be configured to clean the cache to maintain an updated cache.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for progressive loading for web-based spreadsheet applications will be presented.

Referring now to FIG. 1, aspects of one operating environment 100 for the various embodiments presented herein will be described. The operating environment 100 shown in FIG. 1 includes a user device 102. According to various embodiments, the functionality of the user device 102 can be provided by a personal computer ("PC") such as a desktop, tablet, or laptop computer system. In some other embodiments, the functionality of the user device 102 can be provided by other types of computing systems including, but not limited to, a handheld computer, a netbook computer, an embedded computer system, a personal digital assistant ("PDA"), a mobile telephone, a smart phone, or another computing device.

Various embodiments of the user device 102 are illustrated and described below, particularly with reference to FIGS. 5-7. According to various embodiments of the concepts and technologies disclosed herein for row and column navigation, the functionality of the user device 102 is described as being provided by a tablet or slate computing device, a smartphone, or a PC having a touch-sensitive display. Because the functionality described herein with respect to the user device 102 can be provided by additional and/or alternative devices, it should be understood that these embodiments are illustrative, and should not be construed as being limiting in any way.

The user device 102 can be configured to execute an operating system 106, one or more application programs 108, and a progressive loading module 110. The operating system 106 is a computer program for controlling the operation of the user device 102. The application programs 108 and the progressive loading module 110 are executable programs configured to execute on top of the operating system 106 to provide various functions. According to various implementations, the application programs 108 include, but are not limited to, web browsing programs, multimedia software, native web-based applications, other applications, or the like. The application programs 108 can be configured to receive or store data 112, to execute various operations with respect to the data 112, and to render various views of the data 112 in one or more user interfaces ("UIs") 114. The UIs 114 can be presented at the user device 102 and/or at other devices.

The progressive loading module 110 can be configured to provide the functionality described herein for providing progressive loading for web-based spreadsheet applications. In some embodiments, the progressive loading module 110 can be configured to determine an amount of the data 112 that is to be stored in a cache 116 by the user device 102 to support navigation within the UIs 114. According to various embodiments, the progressive loading module 110 can be configured to determine the amount of the data 112 to be stored in the cache 116 by determining sizes of a viewport and a window, each of which are described in more detail below.

According to various embodiments, the "viewport" can be used to refer to a size or amount of the data 112 that can be displayed on a screen or display of the user device 102. The progressive loading module 110 can be configured to identify an x-dimension and a y-dimension of the viewport. In some embodiments, wherein the data 112 corresponds to a spreadsheet, the x-dimension of the viewport can correspond to a number of columns of the spreadsheet, and the y-dimension of the viewport can correspond to a number of rows of the spreadsheet. As such, the "viewport" can refer to an amount of a spreadsheet that is displayed at any particular time on the UIs 114. Additional aspects of the viewport are illustrated and described below, particularly with reference to FIGS. 2A-2B.

In some embodiments, the functionality of the progressive loading module 110 can be provided by one or more modules or other functionality. In FIG. 1, the progressive loading module 110 includes, but is not limited to, a gridview module 118, a gridblock manager 120, a UI manager 122, and a pre-loader 124. The functionality of these illustrative modules of the progressive loading module 110 are described in additional detail below. Via execution of these and/or other functionality, the progressive loading module 110 can be configured for determining the size of the viewport can be provided by the application programs 108. For example, the application programs 108 can be configured to execute JAVASCRIPT or other code for determining the size of the viewport ("viewport size") at runtime. For example, a web browser or other application program 108 can be configured to determine the viewport size when requesting a spreadsheet file, when rendering the spreadsheet file, and/or when otherwise obtaining, requesting, rendering, or displaying the data 112. It should be understood that this embodiment is illustrative, and should not be construed as being limiting in any way.

The progressive loading module 110 also can be configured to determine a size or amount of the data 112 that is to be stored in the cache 116 for a "preloaded area." As used herein, a "window" can refer to a buffer or other area around and including the viewport. A "preloaded area" can refer to a buffer or other area around the "window." The progressive loading module 110 can store the data 112 associated with the preloaded area in the cache 116 and use the cached data to update the UIs 114 when a user 126 enters a command, gesture, or other input ("input") 128 for moving the viewport. The input 128 therefore can include, for example, a gesture, a keystroke, a voice command, or other command. In the embodiments described herein, the input 128 includes a touch or multi-touch gesture for indicating a command to pan, scroll, or otherwise move within the displayed spreadsheet. It should be understood that these embodiments are illustrative, and should not be construed as being limiting in any way.

Via execution of the gridview module 118, the gridblock manager 120, the UI manager 122, and the pre-loader 124, the progressive loading module 110 can be configured to handle data requests at the user device 102, to determine how much of the data 112 to download at the user device 102, and how to render the requested data 112 as web elements such as HTML code, or the like. As such, the gridview module 118, the gridblock manager 120, the UI manager 122, and the pre-loader 124 can be configured to obtain the data 112 at the user device 102 for presentation in the UIs 114 and/or for storage in the cache 116.

In some embodiments, the gridview module 118 is configured to determine a position, within a spreadsheet file or other document, of the viewport described above. The gridview module 118 can determine this information based upon a position of a cursor or selected cell within the spreadsheet, and/or based upon data obtained at the user device 102, for example, during interactions between the user device 102 and the server application 132. Based upon the determination of the position of the viewport and associated window, the gridview module 118 can be configured to generate requests from the gridblock manager 120 for the data 112, and to update the data 112 based upon a response from the gridblock manager 120.

The gridblock manager 120 can be configured to receive the requests for the data 112 from the gridview module 118, and to respond to the requests with information identifying the data 112 that is to be cached to support the window and/or viewport. As such, the gridview module 118 and the gridblock manager 120 can cooperate with one another to identify the data 112 to be cached at the user device 102. Once the data 112 to be cached is identified, the identification of the data 112 can be passed to the UI manager 122.

The UI manager 122 can be configured to convert the identified data 112 to convert the identified data into HTML or other web-based data elements. The UI manager 122 also can cooperate with a render proxy or other modules to update the UIs 114. In particular, the UI manager 122 can be configured to update the spreadsheet, headers, formula bars, or the like, and to serve JAVASCRIPT events to the user device 102 to update the UIs 114. As such, the server application 132 can be configured to pass the data 112 to the user device 102 for caching, as well as web events such as JAVASCRIPT events to update the UIs 114. As such, the server application 132 can control the data 112 that flows to the user device 102, as well as the updating of the UIs 114 in response to the input 128 received at the user device 102.

The pre-loader 124 can be configured to identify a pre-loaded area adjacent or proximate to the viewport and the window. The "preloaded area" can include one or more cells that are adjacent to the window. According to various embodiments, including the embodiments illustrated and described herein with reference to FIGS. 2A-2B, the pre-loaded area includes each cell adjacent to the window. As such, the preloaded area can be a ring of cells around the window. It should be understood that this embodiment is illustrative, and should not be construed as being limiting in any way.

According to various embodiments, the progressive loading module 110 can be configured to assign dimensions to the window based upon dimensions of the viewport, though this is not necessarily the case. If the size of the window ("window size") is related to the viewport size, the relationship between the viewport size and the window size can be based upon predicted movements within the spreadsheet, user settings, application settings, or the like. In some embodiments, the progressive loading module 110 is configured to assign define the window size as three times the x-dimension of the viewport size, and three times the y-dimension of the viewport size, with the viewport centered within the window. As such, the dimensions of the window size can correspond to 3x and 3y, based upon dimensions of the viewport of x and y, respectively. The progressive loading module 110 can be configured to store the data 112 for the window such that the UIs 114 can be updated for any movement within the UIs 114 of up to one viewport in any direction away from the centered viewport. This relationship will be easier understood with reference to FIGS. 2A-2B below. Because other relationships are possible and are contemplated, it should be understood that this embodiment is illustrative, and should not be construed as being limiting in any way.

As mentioned above, the progressive loading module 110 can be configured to communicate with the application programs 108 to provide the functionality described herein and/or the application programs 108 can be configured to provide the functionality described herein with respect to the progressive loading module 110. As such, while the application programs 108 and the progressive loading module 110 are illustrated in FIG. 1 as separate entities, it should be understood that the functionality of these and/or other modules described herein can be provided by a single application or module. As such, it should be understood that the illustrated embodiment is illustrative, and should not be construed as being limiting in any way.

The UIs 114 can include, in various embodiments, computer-executable code that, when executed by the user device 102, causes the user device 102 to present a user interface for viewing the data 112, for supporting interactions by the user 126 with the data 112, to allow the user 126 to interact with the application programs 108 executed by the user device 102, and/or to support viewing and/or otherwise interacting with the data 112. Various embodiments of some illustrative UIs 114 are illustrated and described below with reference to FIGS. 4A-4D. Briefly, the UIs 114 can include various application-specific and/or device-specific menus, soft buttons, and/or other types of controls for controlling the application programs 108, for interacting with the data 112, and/or for interacting with or controlling other applications or resources associated with and/or accessed by the user device 102.

As mentioned above, the data 112 can correspond to spreadsheet data or data in other grid-based or tabular formats. In some embodiments, the data 112 can be obtained from a data source such as a database, a datastore, a network storage device, or another data storage device such as a server computer 130 that is operating as part of, or in communication with, the network 104. Because the data 112 can be obtained from almost any source, it should be understood that the illustrated embodiment in which the data 112 is obtained from the server computer 130 is illustrative and should not be construed as being limiting in any way.

The server computer 130 can be configured to execute a server application 132 for hosting and/or serving the data 112 to the user device 102 and/or other devices, nodes, and/or networks. According to various embodiments, the data 112 corresponds to a spreadsheet generated and/or readable by a member of the MICROSOFT EXCEL family of products from Microsoft Corporation in Redmond, Wash. In other embodiments, the data 112 corresponds to a HTML file, an XML file, other types of files, and/or various scripts such as, for example, JAVASCRIPT, and/or other web-based file formats or executable code that, when executed and/or rendered by the application programs 108, represent various files. As such, the functionality of the server application 132 can be provided by a member of the EXCEL WEB APPLICATION ("EWA") family of spreadsheet software from Microsoft Corporation in Redmond, Wash. It should be understood that this embodiment is illustrative, and should not be construed as being limiting in any way.

As such, in various implementations of the concepts and technologies disclosed herein, the files represented by the data 112 can include, but are not limited to, files in web-based formats for representing spreadsheets, workbooks, tables, grids, or other types of files. Because the data 112 can include data in the above-described, as well as other formats, it should be understood that the above embodiments are illustrative, and should not be construed as being limiting in any way.

According to various embodiments disclosed herein, the user device 102 can be configured to access or receive the data 112 corresponding to a spreadsheet or other file. The user device 102 can execute the progressive loading module 110 to determine, for example at runtime, a size or amount of data 112 that can be presented on a display device associated with the user device 102. In some embodiments, the user device 102 is configured to determine dimensions of a viewport associated with the display and a window that surrounds the viewport. In some embodiments, the user device 102 is configured to request "blocks" of data to request a range of cells from a server such as the server computer 130. Thus, when the specification refers to requesting the data 112, it should be understood that the user device 102 can request a range of cells and/or the data 112 associated with that range of cells.

The user device 102 can obtain the data 112 from the server computer 130 and store the data 112 in the cache 116. The user device 102 also can use the data 112 to generate the UIs 114 for presenting the viewport. If the viewport is moved, for example by entry of a pan or scroll command by the user 126, the user device 102 can be configured to determine if the data 112 to be used to generate the moved viewport exists in the cache 116. If the data 112 to be used to generate the moved viewport exists in the cache 116, the user device 102 can generate the moved viewport without obtaining additional data 112 from the server computer 130. If the data to be used to generate the moved viewport does not exist in the cache 116, the user device 102 can obtain additional data 112 from the server computer 130, cache the data 112, and generate the moved viewport.

The user device 102 also can be configured to update the cache 116 to cache the data 112 associated with the moved window. In some embodiments, the user device 102 also can be configured to clean the cache 116. The cache cleaning can be accomplished using any desired scheme including. The cache cleaning can be completed based upon passage of a defined time period, based upon a number of rendered views or UIs 114, and/or based upon other considerations. These and additional aspects of the concepts and technologies disclosed herein for progressive loading for web-based spreadsheet programs will be described in additional detail below.

FIG. 1 illustrates one user device 102, one network 104, and one server computer 130. It should be understood, however, that some implementations of the operating environment 100 include multiple user devices 102, multiple networks 104, and/or multiple server computers 130. Thus, the illustrated embodiment should be understood as being illustrative, and should not be construed as being limiting in any way.

Figure 2A:
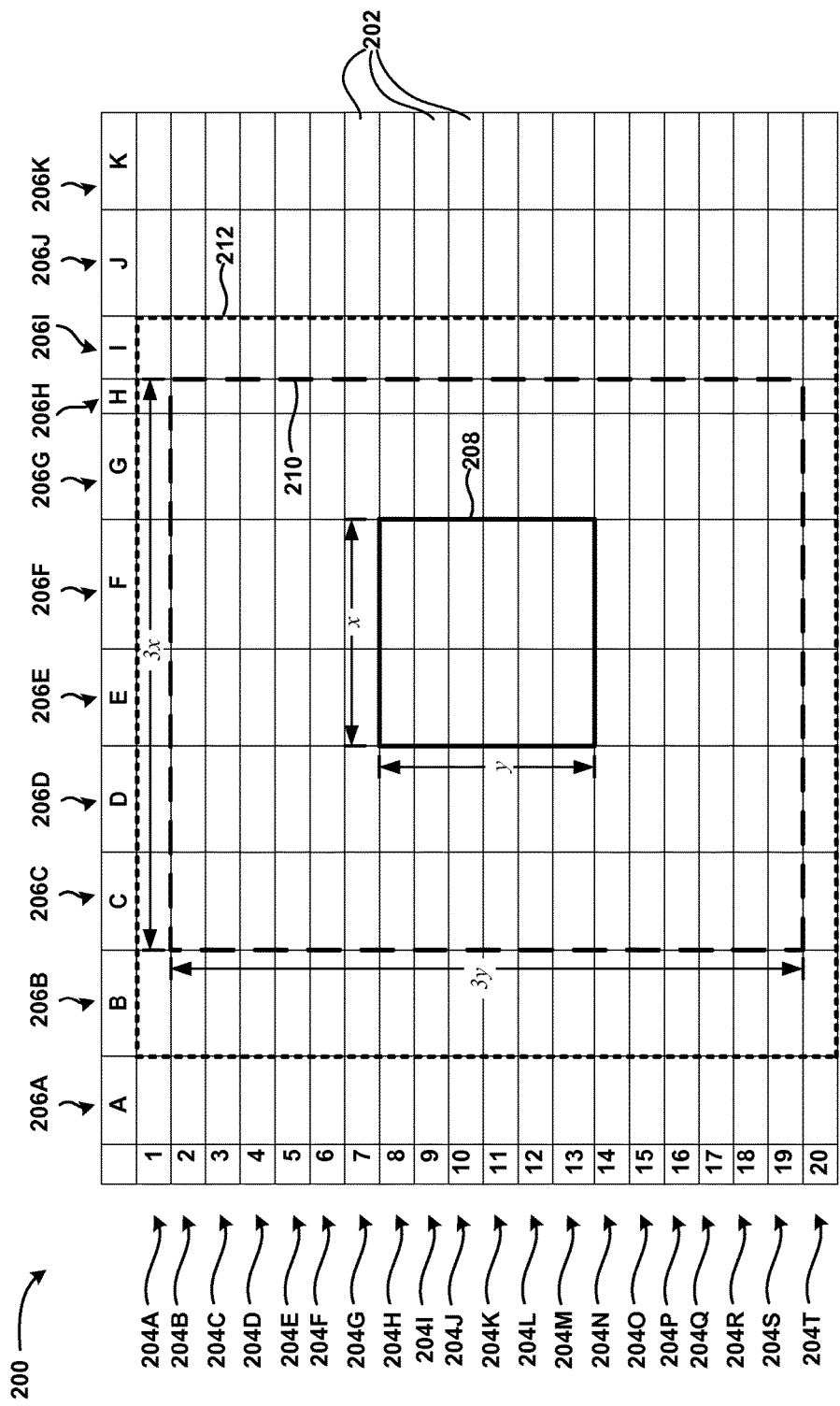
FIGS. 2A-2B are line diagrams schematically illustrating additional aspects of the concepts and technologies disclosed herein for progressive loading for web-based spreadsheet programs, according to various illustrative embodiments.
Figure 2B:
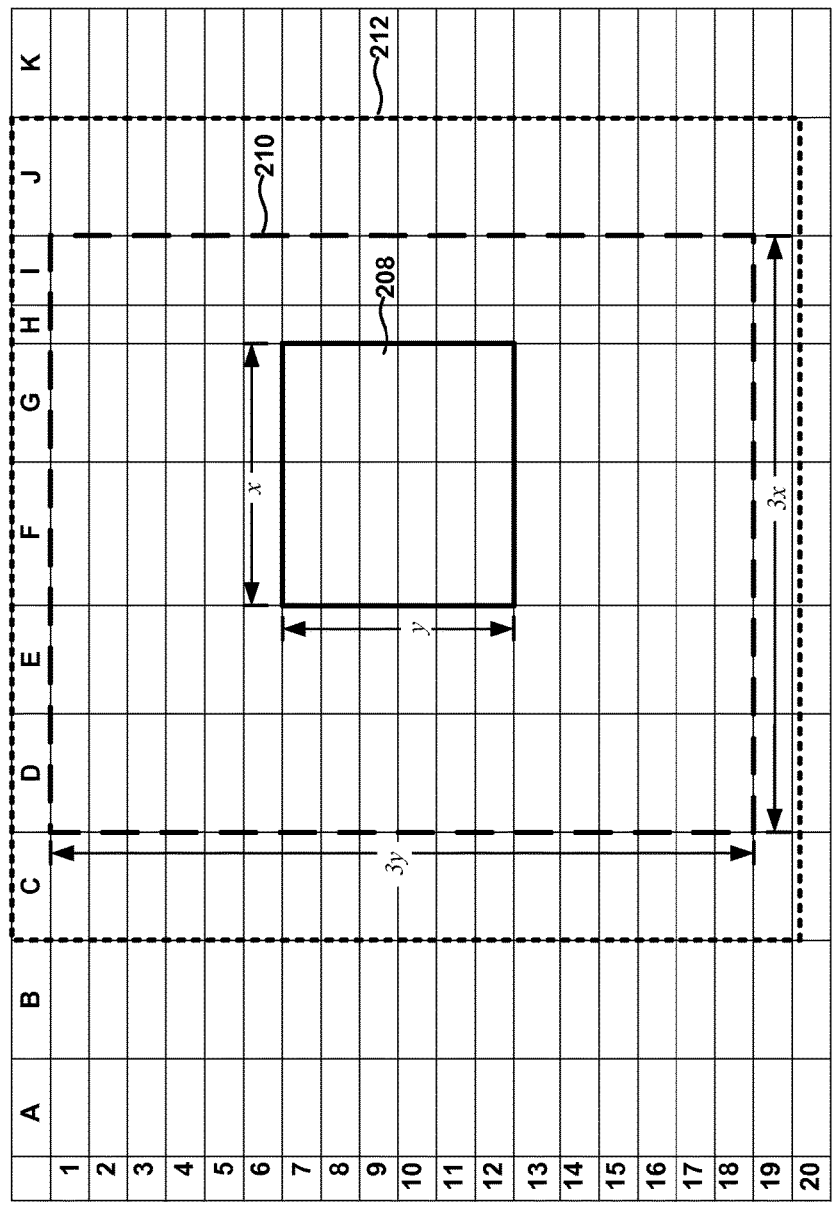

Referring now to FIGS. 2A-2B additional aspects of the concepts and technologies disclosed herein for progressive loading for web-based spreadsheet programs will be described in detail. FIG. 2A illustrates a portion of an example spreadsheet 200 that can correspond to the data 112 described herein. As is generally understood, the spreadsheet 200 can include a number of cells 202 arranged in a number of rows 204A-T (hereinafter collectively and/or generically referred to as "rows 204") and a number of columns 206A-K (hereinafter collectively and/or generically referred to as "columns 206"). Because the spreadsheet 200 can have varied numbers of cells 202, rows 204, and/or columns 206, it should be understood that the illustrated example spreadsheet 200 is illustrative, and should not be construed as being limiting in any way.

As explained above, the spreadsheet 200 can be generated by rendering the data 112, wherein the data 112 can correspond to a spreadsheet file or to HTML or XML content. In some embodiments, the spreadsheet 200 can be generated by the user device 102 by rendering HTML data obtained from the server application 132. It should be understood that this embodiment is illustrative, and should not be construed as being limiting in any way.

In FIG. 2A, an example viewport 208 is illustrated as including the cells 202 with addresses of E8 through F13.

The viewport 208 can be defined as having an x-dimension x and a y-dimension y, as explained above with reference to FIG. 1. In the example shown in FIG. 2A, the x-dimension x of the viewport 208 can be two columns, and the y-dimension y of the viewport 208 can be six rows. As such, in the illustrated embodiment, the user device 102 used to display the spreadsheet 200 can be determined to have a display capable of viewing up to two columns and six rows at the time the dimensions of the viewport 208 are determined. Because the dimensions of the viewport 208 can be determined based upon a zoom level, a font size, cell size, column width, row heights, and/or other aspects of the displayed spreadsheet, it should be understood that this embodiment is illustrative, and should not be construed as being limiting in any way.

As shown in FIG. 2A, a window 210 can be defined as having an x-dimension of three times the x-dimension of the viewport 208, and a y-dimension of three times the y-dimension of the viewport 208. As such, the window 210 can have dimensions of 3x and 3y, though these dimensions are merely illustrative and should not be construed as being limiting in any way. As shown in FIG. 2A, the viewport 208 can be centered within the window 210 and as such, data associated with at least one additional viewport-width and/or viewport-height can exist within the window 210 in any direction around the viewport 208. As explained above, the data 112 associated with the window 210 can be cached or otherwise stored at the user device 102 or other data storage location to enable updating of the UIs 114 if a user pans, scrolls, or otherwise enters a command to navigate within the displayed UIs 114. FIG. 2A also shows a preloaded area 212 described above. The preloaded area 212 can be defined as a ring of cells that border the window 210. The data 112 associated with the preloaded area 212 can be cached or otherwise stored at the user device 102 or other data storage location to enable updating of the UIs 114 if user pans, scrolls, or otherwise navigates within the displayed UIs 114.

In the illustrative example shown in FIG. 2A, the dimensions of the viewport 208 and the window 210 can correspond to a number of the rows 204 and/or a number of the columns 206. In the embodiment illustrated in FIG. 2A, the dimensions of the preloaded area 212 can include a single cell adjacent to each cell in the window, though this is not necessarily the case. Additionally, or alternatively, the dimensions of the viewport 208 and/or the window 210 can correspond to a linear dimension such as a number of pixels, a number of millimeters, a number of inches, or the like, and therefore may correspond to an uneven number of the rows 204 and/or the columns 206. Thus, while a linear dimension of the window 210 on a first side of the viewport 208 may be greater than or less than a linear dimension of the window 210 on a second side of the viewport 208 in FIG. 2A, it should be understood that this embodiment is illustrative, and should not be construed as being limiting in any way.

According to various embodiments of the concepts and technologies disclosed herein, the data 112 associated with the cells 302 included in the window 210 can be cached by the user device 102. In some embodiments, the user device 102 can communicate with the server application 132 and provide to the server application 132 dimensions of the viewport 208. The server application 132 can determine dimensions and positioning of the viewport 208, the window 210, and the preloaded area 212 and respond with the data 112 that corresponds to the window 210 and the preloaded area 212. The user device 102 can store the data 112 in the cache 116 and present the data 112 in the viewport 208 and the window 210 for the UIs 114. If the user device 102 receives input such as the input 128 for moving the viewport 208, the user device 102 can be configured to update the UIs 114.

When updating the UIs 114, the user device 102 can use the data 112 stored in the cache 116. As such, when the viewport 208 is moved, the user device 102 can update the UIs 114 without downloading the data corresponding to the new viewport 208 from the server computer 130. The user device 102 can, however, download data from the server computer 130 when the viewport 208 and associated window 210 and preloaded area 212 are moved. This is explained in more detail below with reference to FIG. 2B.

FIG. 2B illustrates an example of an embodiment in which the viewport 208 and the associated window 210 and preloaded area 212 have been moved. In the illustrated embodiment, the user 126 or other entity has moved the viewport one column to the right (relative to a viewing plane associated with FIG. 2A) and one row up (relative to the same viewing plane). Thus, while the viewport 208 is illustrated in FIG. 2A as encompassing cells E8 through F13, the viewport 208 is illustrated in FIG. 2B as encompassing cells F7 through G12. It should be understood that this embodiment is illustrative, and should not be construed as being limiting in any way.

When the viewport 208 is moved, the user device 102 can render the new viewport 208 using data 112 stored in the cache 116, as explained above. It can be appreciated that some cells from the preloaded area 212 shown in FIG. 2A can be retrieved from the cache 116 and used to render the viewport 208 and/or the window 210. Similarly, the user device 102 can be configured to update the cache 116 to populate the cache 116 with the data 112 associated with the new position of the window 210 and/or the preloaded area 212. In FIG. 2B, the data 112 for cells J1 through J18 therefore can be obtained by the user device 102 from the server computer 130 and added to the cache 116. As such, if the viewport 208 is moved subsequent to the movement illustrated in FIGS. 2A-2B, the viewport 208 again can be generated with data 112 from the cache 116. It should be understood that this embodiment is illustrative, and should not be construed as being limiting in any way.

While not visible in FIGS. 2A-2B, the user device 102 and/or the pre-loader 110 can be configured to clean the cache 116 at any time. In some embodiments, the user device 102 and/or the pre-loader 110 employs a "first-in-first-out" ("FIFO") scheme to clean the cache 116. As such, when the data 112 stored in the cache 116 exceeds a defined threshold, for example the size of the window 210 and the preloaded area 212, the pre-loader 110 can begin deleting data 112 from the cache 116 based upon the FIFO scheme. Thus, the data 112 can be deleted from the cache 116, beginning with the oldest data first. Because other schemes for cleaning the cache 116 are possible and are contemplated, it should be understood that this embodiment is illustrative, and should not be construed as being limiting in any way. Additional aspects of caching the data 112, updating the UIs 114, and cleaning the cache 116 are set forth below in more detail, particularly with reference to FIGS. 3-4D.

Figure 3:
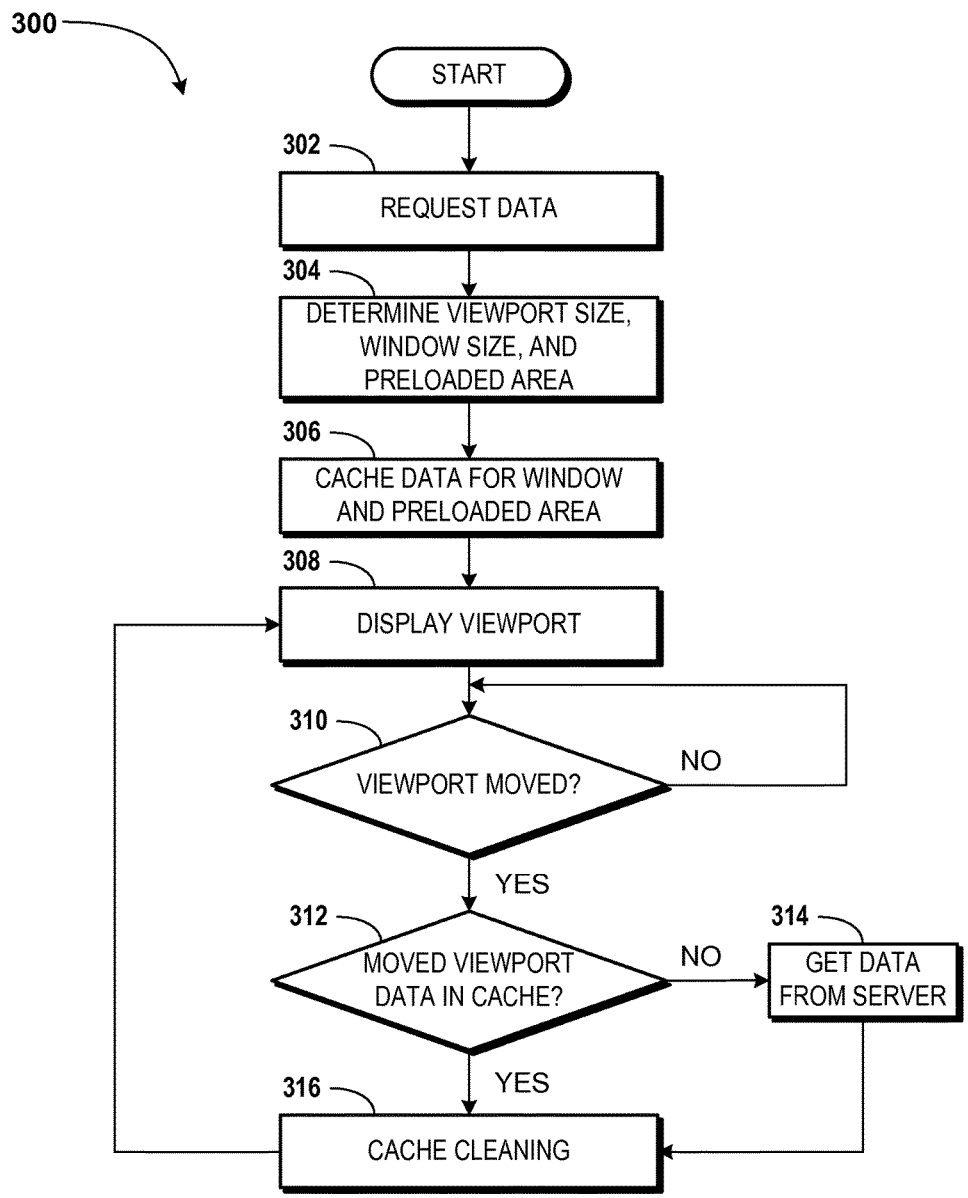
FIG. 3 is a flow diagram showing aspects of a method for progressively loading data, according to an illustrative embodiment.

Turning now to FIG. 3, aspects of a method 300 for progressively loading data will be described in detail. It should be understood that the operations of the method 300 are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated method 300 can be ended at any time and need not be performed in its entirety. Some or all operations of the method 300, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein can be implemented as a sequence of computer implemented acts or program modules running on a computing system, and/or as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the method 300 disclosed herein is described as being performed by the user device 102 via execution of computer executable instructions such as, for example, the application programs 108 and/or the progressive loading module 110. It should be understood that devices other than, or in addition to, the user device 102 can be configured to provide the functionality described herein via execution of various application program, modules, and/or other computer executable instructions in addition to, or instead of, the application programs 108 and/or the progressive loading module 110. As such, it should be understood that the described embodiment is illustrative, and should not be construed as being limiting in any way.

The method 300 begins at operation 302, wherein the user device 102 can request the data 112. According to various embodiments, the request for the data 112 can correspond to a request to open the data 112, for example a spreadsheet file represented by the data 112; a request to download the data 112; a request to access a uniform resource identifier ("URI") associated with the data 112, and/or other requests for accessing and/or viewing the data 112. The requests can be received and/or generated at the user device 102 in any number of manners including voice commands, keystroke commands, touch gestures, multi-touch gestures, mouse clicks, or the like.

From operation 302, the method 300 proceeds to operation 304, wherein the user device 102 can determine a viewport size and a window size, as well as a corresponding preloaded area associated with the window. As explained above, the user device 102 can be configured to determine the viewport size and/or the window size during runtime, for example, via execution of JAVASCRIPT or other scripts or code for determining a display space associated with the user device 102.

As explained above, the window size can be, but is not necessarily, based upon the viewport size. In the embodiment illustrated in FIGS. 2A-2B, the viewport size corresponds to x*y, and the window size corresponds to 3x*3y. Because the dimensions of the viewport 208, the window 210, and the preloaded area 212 can be related or unrelated to one another, and because various dimensions of the viewport 208, the window 210, and/or the preloaded area 212 are possible, it should be understood that these embodiments are illustrative, and should not be construed as being limiting in any way.

From operation 304, the method 300 proceeds to operation 306, wherein the user device 102 caches the data 112 corresponding to the window 210 and the preloaded area 212 determined in operation 304. As explained above with reference to FIG. 1, the user device 102 can inform the server computer 130 of the window size, and the server computer 130 can be configured to determine the data 112 to be cached, based upon the window size. Alternatively, the user device 102 can determine the amount of data to cache and can transmit that information to the server computer 130. The server computer 130 can also be configured to generate HTML elements or other web-based elements corresponding to the data 112 associated with the window 210 and/or the preloaded area 212, if desired, and provide these elements to the user device 102. It should be understood that the user device 102 can be configured to identify and obtain the data 112 from the server computer 130, if desired, and that the embodiment described immediately above therefore is illustrative.

From operation 306, the method 300 proceeds to operation 308, wherein the user device 102 displays the viewport 208. The viewport 208 that is displayed in operation 306 can be generated from at least a portion of the data 112 cached in operation 306. In operation 308, the user device 102 can display the data 112 corresponding to the viewport 208 in a user interface such as the UIs 114.

As explained above in detail, the viewport 208 can be located in the center of the window 210, and therefore can be populated with the data 112 from the cache 116. The data in the preloaded area 212 can be available in the cache 116, but may not be displayed with the window 210. If the viewport 208 is located at a limit of the spreadsheet 200, the viewport 208 may not be centered within the window 210. Similarly, the preloaded area 212 may or may not include data around the entire window 210, if the window 210 is located at a limit of the spreadsheet 200. For example, if a user 126 or entity wishes to view a top left corner of a spreadsheet (corresponding to cell A1, for example in the spreadsheet 200 shown in FIGS. 2A-2B), the user device 102 can be configured to cache a window 210 that provides data corresponding to the size of at least one viewport in each direction of the spreadsheet 200 in which data entries are present, and to cache cells in the preloaded area 212 around any portion of the window 210 that is not bordered by a limit of the spreadsheet 200. In this example scenario, data to the right and down away from the viewport 208 would be included in the window 210 and data on the right and bottom sides of the window 210 may be included in the preloaded area 212. It should be understood that this embodiment is illustrative, and should not be construed as being limiting in any way.

From operation 308, the method 300 proceeds to operation 310, wherein the user device 102 determines if the viewport 208 has been moved. The user device 102 can determine, for example, if input for moving the viewport 208 such as the input 128 described above with reference to FIG. 1 is detected at the user device 102. As such, the user device 102 can determine if a touch-and-drag, click-and-drag, or other pan gesture has been detected, or if other input for scrolling or panning the viewport has been detected at the user device 102.

If the user device 102 determines, in operation 310, that a movement input such as the input 128 has not been detected, the method 300 can return to operation 310 and the user device 102 can again determine if a movement input has been detected. As such, execution of the method 300 can, but does not necessarily, repeat or pause at operation 310 until a movement input such as the input 128 is detected at the user device 102. If the user device 102 determines, in any iteration of operation 310, that a movement input has been detected, the method 300 can proceed to operation 312.

At operation 312, the user device 102 can determine if the data 112 corresponding to the new location of the viewport 208 ("moved viewport") exists in the cache 116. As explained above with reference to FIGS. 1-2B, the cache 116 can store the data 112 for the window 210 and the preloaded area 212. The amount of data 112 stored therefore can vary, based upon the size of the window 210 the preloaded area 212 relative to the viewport 208. In some embodiments, the width and height of the window 210 are three times the width and height of the viewport 208 and the preloaded area 212 is a ring of cells that are adjacent to the border of the window 210. In some other embodiments, the width and height of the window 210 can be more than three times the width and height of the viewport 208 and/or equal to the width and height of the viewport 208, and the preloaded area 212 can be ring of cells that are adjacent to the border of the window 210.

For purposes of describing the concepts and technologies disclosed herein, the window 210 is described herein as having a width that is three times the width of the viewport 208, and a height that is three times the height of the viewport 208, and the preloaded area 212 is described as being one cell width/height adjacent to the window 210 in any direction. As such, in this example the user device 102 can determine if the movement of the viewport 208 exceeds the extents of the window 210 and/or the preloaded area 212. Thus, for example, if the window 210 is six columns wide and eighteen rows tall as shown in FIGS. 2A-2B, and the preloaded area 212 includes a row and column on each side of the window 210, the user device 102 can determine if the viewport 208 was moved more than three columns to the right or left or more than seven columns up or down, therefore exceeding the extents of data in the cache 116 corresponding to the window 210 and/or the preloaded area 212. Because the sizes of the viewport 208, the window 210, and/or the preloaded area 212 can be varied, it should be understood that this embodiment is illustrative, and should not be construed as being limiting in any way.

If the user device 102 determines, in operation 312, that the data 112 corresponding to the moved viewport does not exist in the cache 116, the method 300 can proceed to operation 314, wherein the user device 102 can obtain the data 112 corresponding to the moved viewport. In some embodiments, the user device 102 can request the data 112 from a server such as the server computer 130, and can obtain the data 112 from the server computer 130. As such, operation 314 can be, but is not necessarily, substantially similar to the operation 306 described above.

From operation 314, or from operation 312 if the user device 102 determines in operation 312 that the data 112 corresponding to the moved viewport does exist in the cache 116, the method 300 can proceed to operation 316. In operation 316, the user device 102 can perform a cache cleaning operation. In some embodiments, the user device 102 can determine if a cache cleaning operation should be executed to clean the cache 116 any time the cache 116 is updated and/or whenever the viewport 208, the window 210, and/or the preloaded area 212 is/are moved. In other embodiments, the user device 102 can be configured to periodically clean the cache 116, for example, upon expiration of a timer job.

Upon determining that a cache cleaning operation is to be completed, the user device 102 can execute any desired cache cleaning operation. In some embodiments, as mentioned above, the user device 102 uses a FIFO scheme to erase the oldest data 112 from the cache 116. In some other embodiments, the user device 102 can be configured to remove data 112 from the cache 116 if the data 112 has not been used for a defined period of time and/or for a defined number of viewport 208 renderings and/or updates. Because other cache cleaning schemes are possible and are contemplated, it should be understood that these embodiments are illustrative, and should not be construed as being limiting in any way.

From operation 316, the method 300 can return to operation 308, wherein the moved viewport can be displayed. As such, it can be appreciated that operations 308-316 can be repeated any number of times until the method 300 is ended.

Figure 4A:
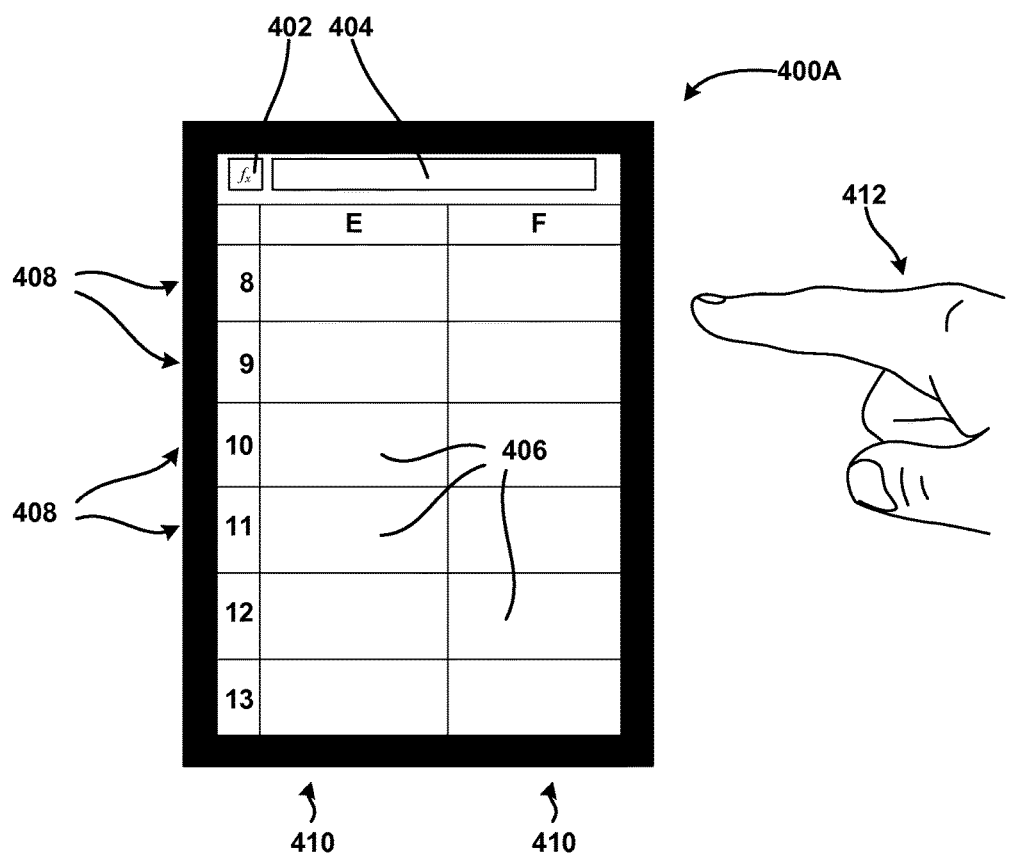
FIGS. 4A-4D are user interface diagrams showing aspects of user interfaces for enabling progressive loading for web-based spreadsheet programs, according to various illustrative embodiments.

Turning now to FIGS. 4A-4D, UI diagrams showing various aspects of the concepts and technologies disclosed herein for progressive loading for web-based spreadsheet applications will be described according to various illustrative embodiments. It should be appreciated that the UI diagrams illustrated in FIGS. 4A-4D can correspond to the illustrative movement of the viewport 208, the window 210, and the preloaded area 212 illustrated in FIGS. 2A-2B. FIG. 4A shows an illustrative screen display 400A generated by a device such as the user device 102. In some embodiments, the screen display 400A corresponds to one or more of the UIs 114 shown in FIG. 1 and described above with reference to FIGS. 1-2. It should be appreciated that the UI diagram illustrated in FIG. 4A is illustrative of one contemplated embodiment, and therefore should not be construed as being limited in any way.

As shown in FIG. 4A, the screen display 400A can include a representation of a spreadsheet such as a portion of the spreadsheet 200 illustrated in FIGS. 2A-2B. More particularly, the screen display 400A is illustrated as displaying the viewport 208 portion of the spreadsheet 200 illustrated in FIGS. 2A-2B. It should be understood that this embodiment is illustrative, and should not be construed as being limiting in any way.

In the illustrated embodiment, the screen display 400A includes a representation of a spreadsheet generated by a member of the MICROSOFT EXCEL family of spreadsheet programs from Microsoft Corporation in Redmond, Wash. In particular, the screen display 400A is illustrated as including a representation of a spreadsheet included in the data 112 generated by the server application 132, wherein the server application 132 can correspond to a web-based MICROSOFT EXCEL application for creating, editing, saving, and/or viewing spreadsheet files. Because other web-based and/or native spreadsheet programs can be used to generate the data 112, it should be understood that this embodiment is illustrative, and should not be construed as being limiting in any way.

As shown in FIG. 4A, the screen display 400A can include a text field 404 for displaying a selected cell 406 in the spreadsheet. The screen display 400A also can include rows 408 and columns 410, which can correspond to one or more, or portions of, the rows 204 and columns 206 described and illustrated above with reference to FIGS. 2A-2B. As is generally understood, the rows 408 can include a header or other label for providing a tag, name, label, category, or explanation of values associated with the rows 408. Similarly, the columns 410 can include a header or other label for providing a tag, name, label, category, or explanation of values associated with the columns 410.

In the illustrated embodiment, the screen display 400A can be presented on a touch-sensitive and/or multi-touch-sensitive display associated with a device such as the user device 102. For purposes of illustration, and not limitation, a user's hand 412 is illustrated proximate to the screen display 400A as if about to initiate an interaction with the screen display 400A. Because other input devices or structures can be used in accordance with the concepts and technologies disclosed herein, it should be understood that this embodiment is illustrative, and should not be construed as being limiting in any way.

Figure 4B:
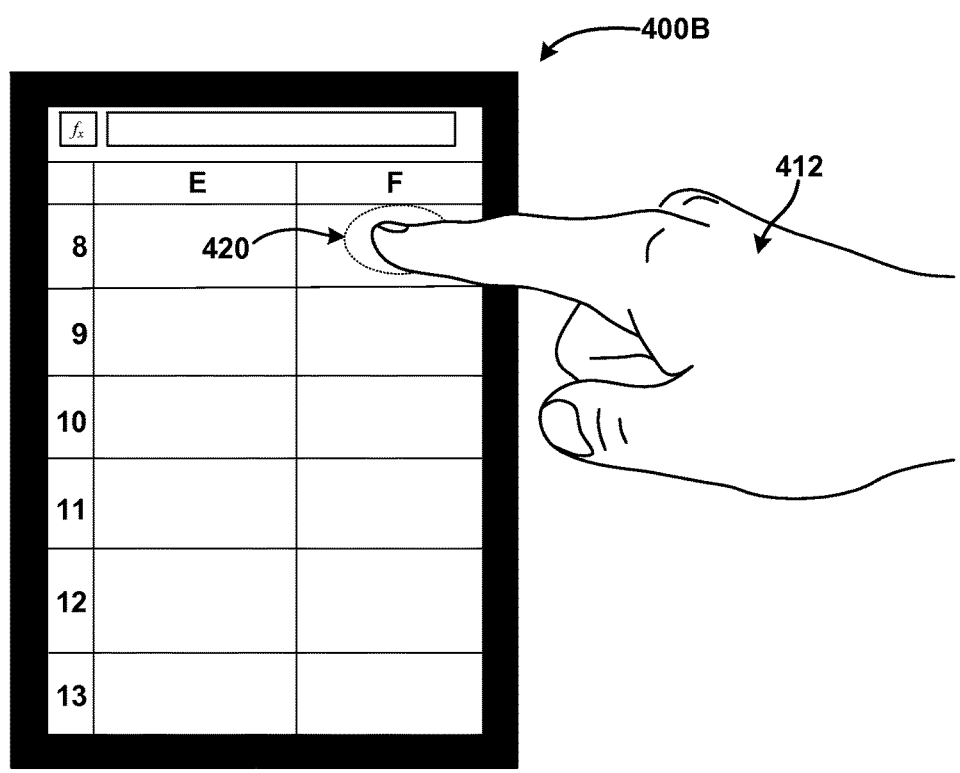

Referring now to FIG. 4B, a UI diagram showing additional aspects of the concepts and technologies disclosed herein for progressive loading for web-based spreadsheet applications is described in detail. In particular, FIG. 4B shows a screen display 400B generated by a device such as the user device 102. In some embodiments, the screen display 400B corresponds to one or more of the UIs 114 shown in FIG. 1 and described above with reference to FIGS. 1-4A. It should be appreciated that the UI diagram illustrated in FIG. 4B is illustrative of one contemplated embodiment, and therefore should not be construed as being limited in any way. In FIG. 4B, the user's hand 412 is illustrated as being brought into contact with the screen or display used to present the screen display 400B. In particular, the user's hand 412 is illustrated as engaging a contact point or points ("contact point") 420 on the screen or display. The illustrated contact point 420 is illustrative and should not be construed as being limiting in any way.

According to various embodiments, the user device 102 or other device configured to present the screen display 400B can be configured to register touch events when the user's hand 412 or other device or entity is brought into contact with the screen or display used to present the screen display 400B. The user device 102 also can be configured to track movement of the user's hand 412 or other device or entity to interpret the movement associated with the touch event. As such, the user device 102 can be configured to take various actions in response to the touch event including, but not limited to, executing a select command to select a cell corresponding to the contact point 420, to begin executing a scroll command, to begin executing a pan command, to begin executing a zoom command, and/or to begin monitoring movement of the contact point 420 to provide the functionality described herein for progressive loading for web-based spreadsheet applications. Because the user device 102 can be configured to execute other commands upon registering a touch event, it should be understood that these embodiments are illustrative, and should not be construed as being limiting in any way.

Figure 4C:
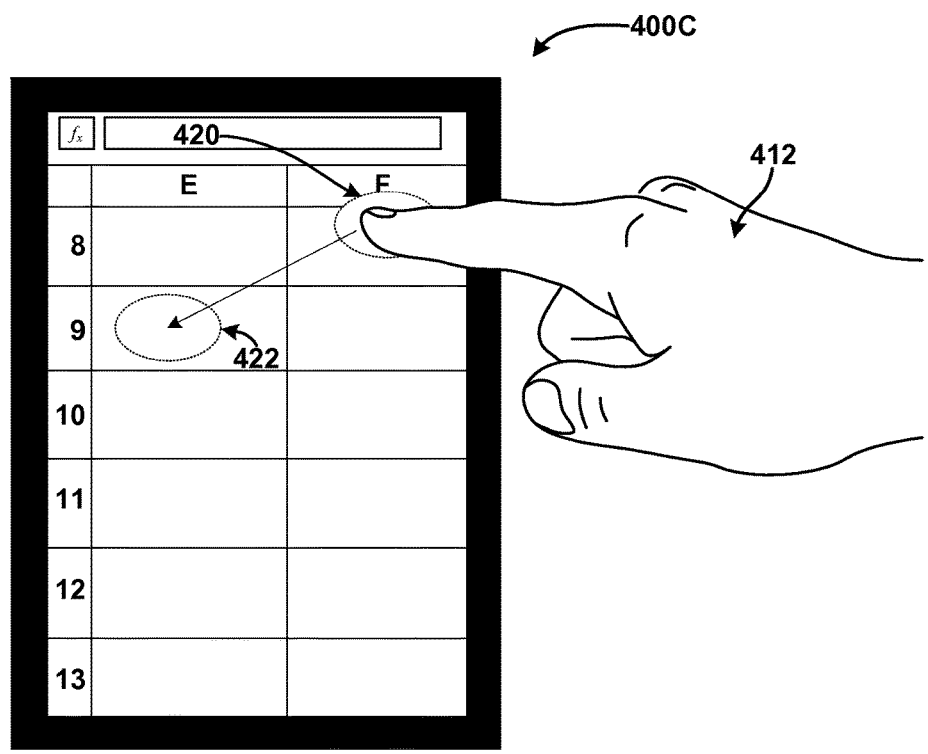

Referring now to FIG. 4C, a UI diagram showing additional aspects of the concepts and technologies disclosed herein for progressive loading for web-based spreadsheet applications is described in detail. In particular, FIG. 4C shows a screen display 400C generated by a device such as the user device 102. In some embodiments, the screen display 400C corresponds to one or more of the UIs 114 shown in FIG. 1 and described above with reference to FIGS. 1-4B. It should be appreciated that the UI diagram illustrated in FIG. 4C is illustrative of one contemplated embodiment, and therefore should not be construed as being limited in any way.

In FIG. 4C, the user's hand 412 is illustrated as having been moved from the contact point 420 shown in FIG. 4B to a release point 422. The release point 422 shown in FIG. 4C can correspond to a point or points on the screen or display used to present the screen display 400C at which movement of the user's hand 412 terminates and at which the user's hand 412 is removed from contact with the screen or display used to present the screen display 400C. It should be understood that the illustrated release point 422 is illustrative and should not be construed as being limiting in any way.

Figure 4D:
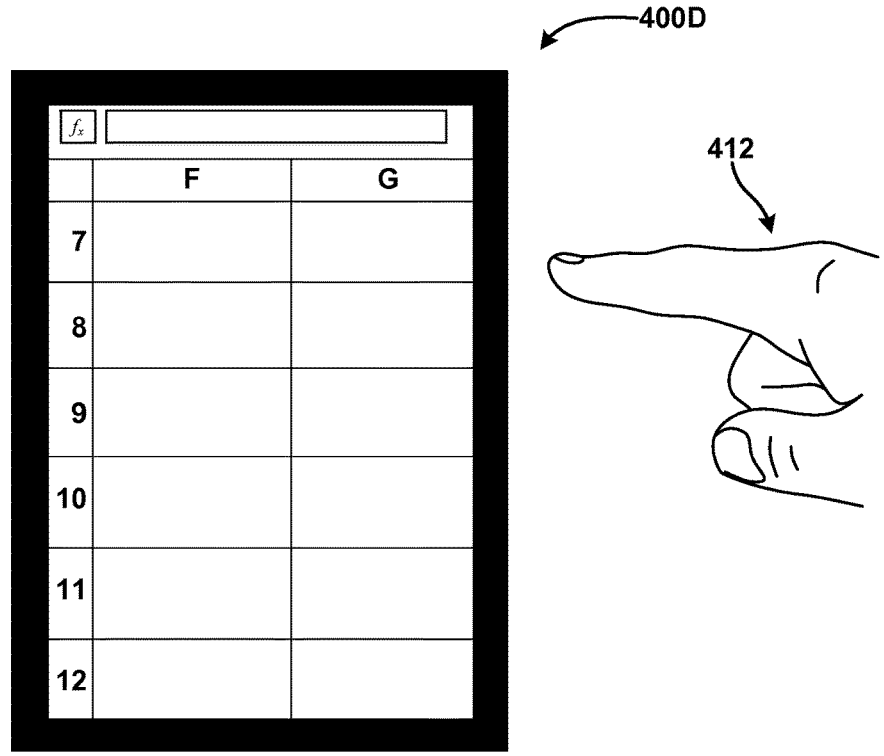

As can be appreciated by collectively referring to FIGS. 4B and 4C, the movement of the user's hand 412 captured in these FIGURES can correspond to a navigation command, described above as the input 128. Thus, the illustrated movement shown in FIG. 4C can correspond to a gesture for creating the input 128 and can correspond, for example, to a command for panning the screen display 400C, scrolling the screen display 400C, and/or other commands. In the illustrated embodiment, the input 128 can correspond to a command to pan the displayed viewport 308 with a movement corresponding to moving the cell "E9" (corresponding to the second row in the column labeled "E") from the contact point 420 to the release point 422. Thus, the movement shown in FIG. 4C can correspond to the example movement described above with reference to FIGS. 2A-2B. Movement of the screen display 400C in accordance with the illustrated input 128 is shown in FIG. 4D. It should be understood that this embodiment is illustrative, and should not be construed as being limiting in any way.

Although not visible in FIGS. 4A-4D, it should be clear from the above description of FIGS. 2A-3 that the user device 102 can be configured to generate the screen display 400D using the data 112 stored in the cache 116. Additionally, the user device 102 can be configured to update the cache 116 to obtain the data 112 associated with the moved window. Additionally, the user device 102 can be configured to clean the cache 116, as explained above with reference to FIG. 3. From the above description, it can be appreciated that the display of the moved viewport can be completed without obtaining additional data 112 from the server computer 130. In some embodiments, the user device 102 can access the server computer 130. For example, the user device 102 can obtain the data 112 from the server computer 130 if the movement of the viewport 208 exceeds a range of the window 210. The user device 102 also can access the server computer 130 to enable the user device 102 to update the cache 116 and/or during cleaning of the cache 116.

FIG. 5 illustrates an illustrative computer architecture 500 for a device capable of executing the software components described herein for progressive loading for web-based spreadsheet applications. Thus, the computer architecture 500 illustrated in FIG. 5 illustrates an architecture for a server computer, mobile phone, a PDA, a smart phone, a desktop computer, a netbook computer, a tablet computer, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing the operating system 106 and one or more application programs including, but not limited to, the application programs 108 and the progressive loading module 110. The mass storage device 512 also can be configured to store the cache 116. Although not shown in FIG. 5, the mass storage device 512 also can be configured to store the data 112 and the UIs 114, if desired.

The mass storage device 512 can be connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium" and variations thereof, does not include waves, signals, and/or other transitory and/or intangible communication media, per se.

According to various embodiments, the computer architecture 500 may operate in a networked environment using logical connections to remote computers through a network such as the network 104. The computer architecture 500 may connect to the network 104 through a network interface unit 514 connected to the bus 510. It should be appreciated that the network interface unit 514 also may be utilized to connect to other types of networks and remote computer systems such as, for example, the server computer 130. The computer architecture 500 also may include an input/output controller 516 for receiving and processing input from a number of other devices, including a keyboard, mouse, or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Figure 6:
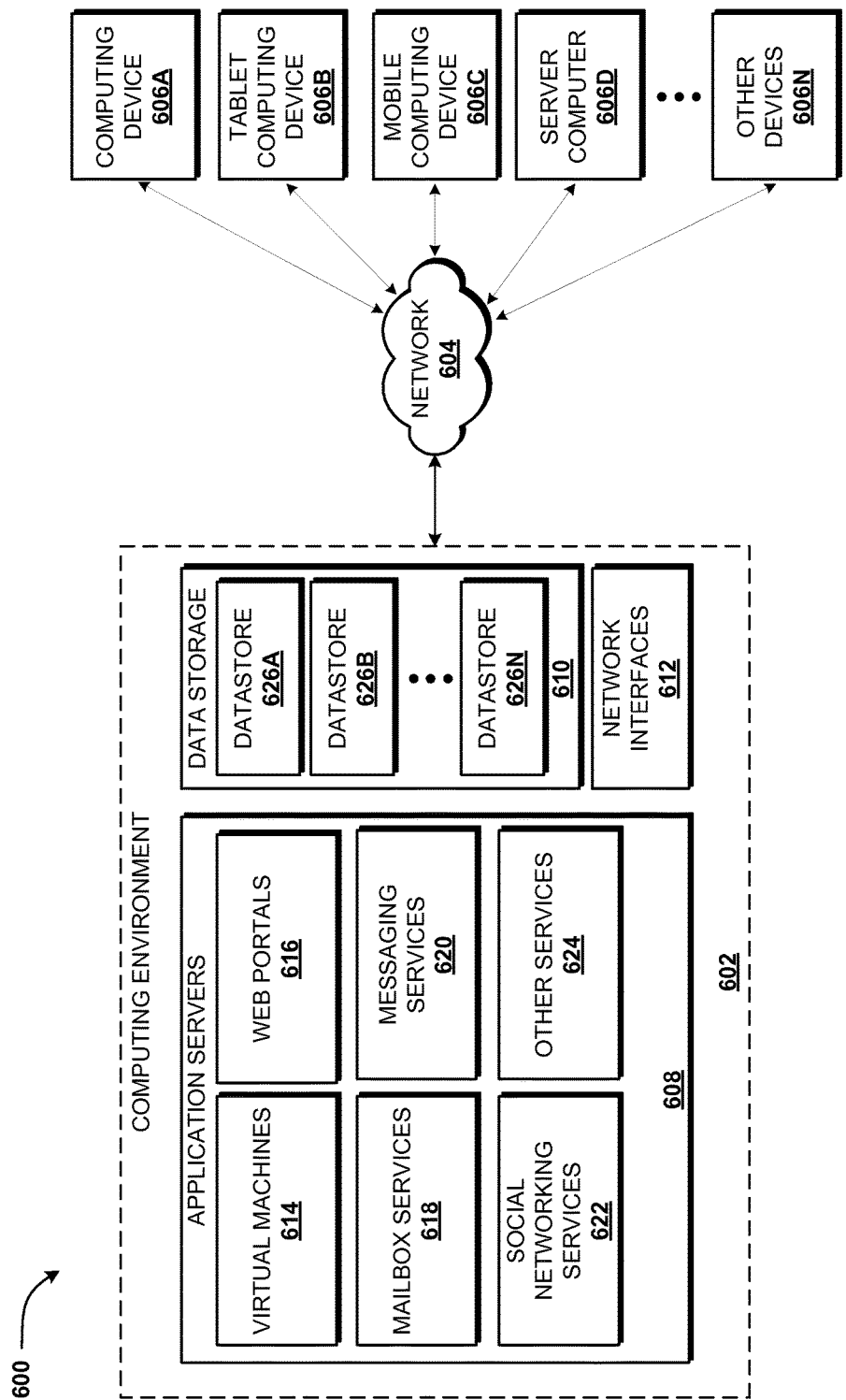
FIG. 6 is a diagram illustrating a distributed computing environment capable of implementing aspects of the embodiments presented herein.

FIG. 6 illustrates an illustrative distributed computing environment 600 capable of executing the software components described herein for progressive loading for webbased spreadsheet applications. Thus, the distributed computing environment 600 illustrated in FIG. 6 can be used to provide the functionality described herein with respect to the user device 102 and/or the server computer 130. The distributed computing environment 600 thus may be utilized to execute any aspects of the software components presented herein.

According to various implementations, the distributed computing environment 600 includes a computing environment 602 operating on, in communication with, or as part of the network 604. The network 604 also can include various access networks. According to various implementations, the functionality of the network 604 can be provided by the network 104 illustrated in FIGS. 1 and 5. One or more client devices 606A-606N (hereinafter referred to collectively and/or generically as "clients 606") can communicate with the computing environment 602 via the network 604 and/or other connections (not illustrated in FIG. 6). In the illustrated embodiment, the clients 606 include a computing device 606A such as a laptop computer, a desktop computer, or other computing device; a slate or tablet computing device ("tablet computing device") 606B; a mobile computing device 606C such as a mobile telephone, a smart phone, or other mobile computing device; a server computer 606D; and/or other devices 606N. It should be understood that any number of clients 606 can communicate with the computing environment 602. Two example computing architectures for the clients 606 are illustrated and described herein with reference to FIGS. 5 and 7. It should be understood that the illustrated clients 606 and computing architectures illustrated and described herein are illustrative, and should not be construed as being limited in any way.

In the illustrated embodiment, the computing environment 602 includes application servers 608, data storage 610, and one or more network interfaces 612. According to various implementations, the functionality of the application servers 608 can be provided by one or more server computers that are executing as part of, or in communication with, the network 604. The application servers 608 can host various services, virtual machines, portals, and/or other resources. In the illustrated embodiment, the application servers 608 host one or more virtual machines 614 for hosting applications or other functionality. According to various implementations, the virtual machines 614 host one or more applications and/or software modules for providing the functionality described herein for progressive loading for web-based spreadsheet applications. It should be understood that this embodiment is illustrative, and should not be construed as being limiting in any way. The application servers 608 also host or provide access to one or more Web portals, link pages, Web sites, and/or other information ("Web portals") 616.

According to various implementations, the application servers 608 also include one or more mailbox services 618 and one or more messaging services 620. The mailbox services 618 can include electronic mail ("email") services. The mailbox services 618 also can include various personal information management ("PIM") services including, but not limited to, calendar services, contact management services, collaboration services, and/or other services. The messaging services 620 can include, but are not limited to, instant messaging services, chat services, forum services, and/or other communication services.

The application servers 608 also can include one or more social networking services 622. The social networking services 622 can include various social networking services including, but not limited to, services for sharing or posting status updates, instant messages, links, photos, videos, and/or other information; services for commenting or displaying interest in articles, products, blogs, or other resources; and/or other services. In some embodiments, the social networking services 622 are provided by or include the FACEBOOK social networking service, the LINKEDIN professional networking service, the MYSPACE social networking service, the FOURSQUARE geographic networking service, the YAMMER office colleague networking service, and the like. In other embodiments, the social networking services 622 are provided by other services, sites, and/or providers that may or may not explicitly be known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 622 also can include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services 622 are not mentioned herein for the sake of brevity. As such, the above embodiments are illustrative, and should not be construed as being limited in any way.

As shown in FIG. 6, the application servers 608 also can host other services, applications, portals, and/or other resources ("other resources") 624. The other resources 624 can include, but are not limited to, the server application 132. It thus can be appreciated that the computing environment 602 can provide integration of the concepts and technologies disclosed herein provided herein for progressive loading for web-based spreadsheet applications with various mailbox, messaging, social networking, and/or other services or resources.

As mentioned above, the computing environment 602 can include the data storage 610. According to various implementations, the functionality of the data storage 610 is provided by one or more databases operating on, or in communication with, the network 604. The functionality of the data storage 610 also can be provided by one or more server computers configured to host data for the computing environment 602. The data storage 610 can include, host, or provide one or more real or virtual datastores 626A-626N (hereinafter referred to collectively and/or generically as "datastores 626"). The datastores 626 are configured to host data used or created by the application servers 608 and/or other data. Although not illustrated in FIG. 6, the datastores 626 also can host or store the data 112, the UIs 114, and/or the cache 116, if desired.

The computing environment 602 can communicate with, or be accessed by, the network interfaces 612. The network interfaces 612 can include various types of network hardware and software for supporting communications between two or more computing devices including, but not limited to, the clients 606 and the application servers 608. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 provides the software functionality described herein as a service to the clients 606. It should be understood that the clients 606 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 600 to utilize the functionality described herein for progressive loading for web-based spreadsheet applications.

Figure 7:
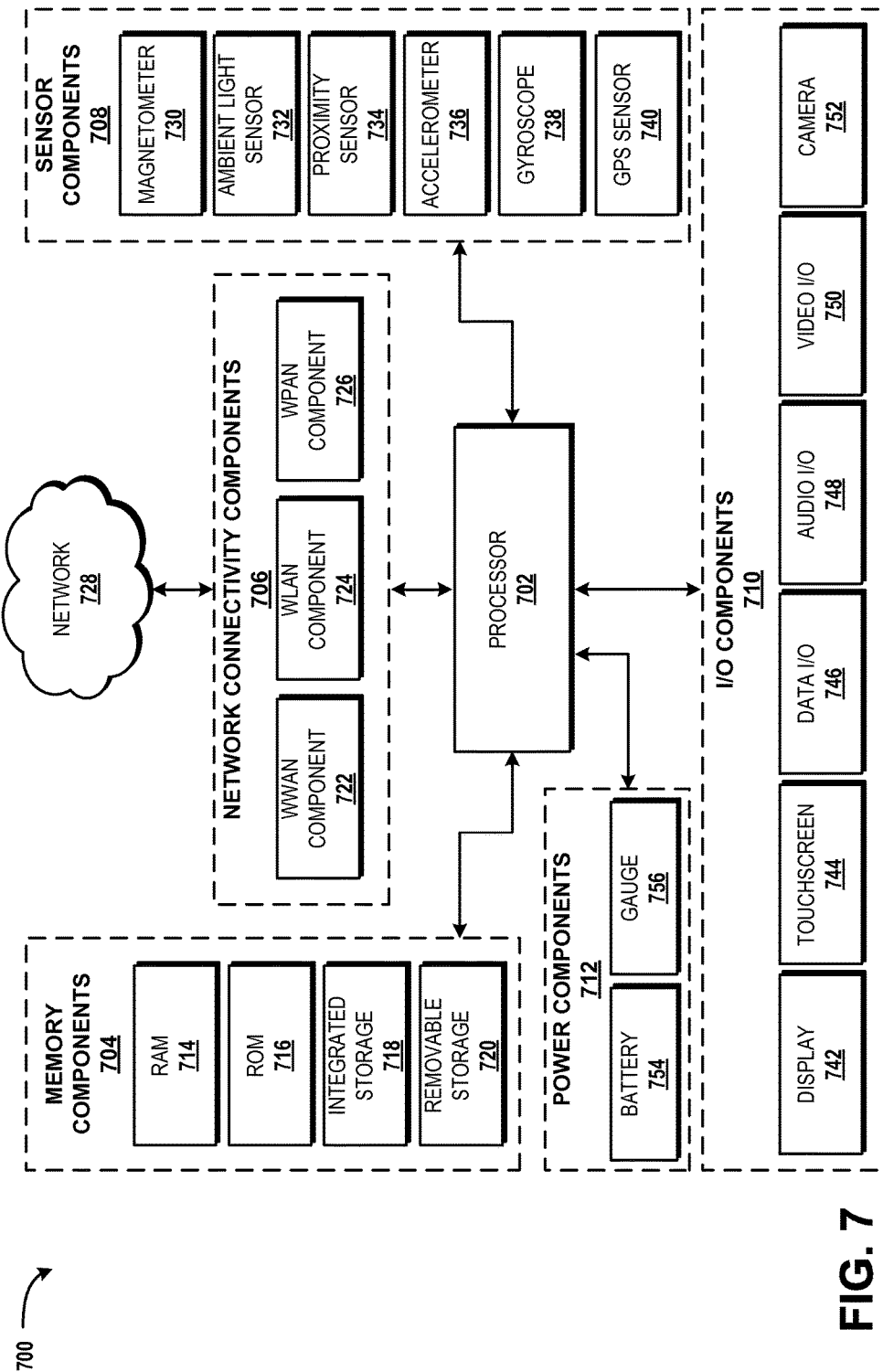
FIG. 7 is a computer architecture diagram illustrating a computing device architecture capable of implementing aspects of the embodiments presented herein.

Turning now to FIG. 7, an illustrative computing device architecture 700 for a computing device that is capable of executing various software components described herein for progressive loading for web-based spreadsheet applications. The computing device architecture 700 is applicable to computing devices that facilitate mobile computing due, in part, to form factor, wireless connectivity, and/or battery-powered operation. In some embodiments, the computing devices include, but are not limited to, mobile telephones, tablet devices, slate devices, portable video game devices, and the like. Moreover, the computing device architecture 700 is applicable to any of the clients 706 shown in FIG. 6. Furthermore, aspects of the computing device architecture 700 may be applicable to traditional desktop computers, portable computers (e.g., laptops, notebooks, ultra-portables, and netbooks), server computers, and other computer systems, such as described herein with reference to FIG. 5. For example, the single touch and multi-touch aspects disclosed herein below may be applied to desktop computers that utilize a touchscreen or some other touch-enabled device, such as a touch-enabled track pad or touch-enabled mouse.

The computing device architecture 700 illustrated in FIG. 7 includes a processor 702, memory components 704, network connectivity components 706, sensor components 708, input/output components 710, and power components 712. In the illustrated embodiment, the processor 702 is in communication with the memory components 704, the network connectivity components 706, the sensor components 708, the input/output ("I/O") components 710, and the power components 712. Although no connections are shown between the individuals components illustrated in FIG. 7, the components can interact to carry out device functions. In some embodiments, the components are arranged so as to communicate via one or more busses (not shown).

The processor 702 includes a central processing unit ("CPU") configured to process data, execute computer-executable instructions of one or more application programs, and communicate with other components of the computing device architecture 700 in order to perform various functionality described herein. The processor 702 may be utilized to execute aspects of the software components presented herein and, particularly, those that utilize, at least in part, a touch-enabled input.

In some embodiments, the processor 702 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720p, 1080p, and greater), video games, three-dimensional ("D") modeling applications, and the like. In some embodiments, the processor 702 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some embodiments, the processor 702 is, or is included in, a system-on-chip ("SoC") along with one or more of the other components described herein below. For example, the SoC may include the processor 702, a GPU, one or more of the network connectivity components 706, and one or more of the sensor components 708. In some embodiments, the processor 702 is fabricated, in part, utilizing a package-on-package ("PoP") integrated circuit packaging technique. Moreover, the processor 702 may be a single core or multi-core processor.

The processor 702 may be created in accordance with an ARM architecture, available for license from ARM HOLDINGS of Cambridge, United Kingdom. Alternatively, the processor 702 may be created in accordance with an x86 architecture, such as is available from INTEL CORPORATION of Mountain View, Calif. and others. In some embodiments, the processor 702 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 704 include a random access memory ("RAM") 714, a read-only memory ("ROM") 716, an integrated storage memory ("integrated storage") 718, and a removable storage memory ("removable storage") 720. In some embodiments, the RAM 714 or a portion thereof, the ROM 716 or a portion thereof, and/or some combination the RAM 714 and the ROM 716 is integrated in the processor 702. In some embodiments, the ROM 716 is configured to store a firmware, an operating system or a portion thereof (e.g., operating system kernel), and/or a bootloader to load an operating system kernel from the integrated storage 718 or the removable storage 720.

The integrated storage 718 can include a solid-state memory, a hard disk, or a combination of solid-state memory and a hard disk. The integrated storage 718 may be soldered or otherwise connected to a logic board upon which the processor 702 and other components described herein also may be connected. As such, the integrated storage 718 is integrated in the computing device. The integrated storage 718 is configured to store an operating system or portions thereof, application programs, data, and other software components described herein.

The removable storage 720 can include a solid-state memory, a hard disk, or a combination of solid-state memory and a hard disk. In some embodiments, the removable storage 720 is provided in lieu of the integrated storage 718. In other embodiments, the removable storage 720 is provided as additional optional storage. In some embodiments, the removable storage 720 is logically combined with the integrated storage 718 such that the total available storage is made available and shown to a user as a total combined capacity of the integrated storage 718 and the removable storage 720.

The removable storage 720 is configured to be inserted into a removable storage memory slot (not shown) or other mechanism by which the removable storage 720 is inserted and secured to facilitate a connection over which the removable storage 720 can communicate with other components of the computing device, such as the processor 702. The removable storage 720 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 704 can store an operating system. According to various embodiments, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 706 include a wireless wide area network component ("WWAN component") 722, a wireless local area network component ("WLAN component") 724, and a wireless personal area network component ("WPAN component") 726. The network connectivity components 706 facilitate communications to and from a network 728, which may be a WWAN, a WLAN, or a WPAN. Although a single network 728 is illustrated, the network connectivity components 706 may facilitate simultaneous communication with multiple networks. For example, the network connectivity components 706 may facilitate simultaneous communications with multiple networks via one or more of a WWAN, a WLAN, or a WPAN.

In some embodiments, the functionality of the network 728 is provided by the network 104 and/or the network 604. In some other embodiments, the network 728 includes the network 104 and/or the network 604. In yet other embodiments, the network 728 provides access to the network 104 and/or the network 604.

The network 728 may be a WWAN, such as a mobile telecommunications network utilizing one or more mobile telecommunications technologies to provide voice and/or data services to a computing device utilizing the computing device architecture 700 via the WWAN component 722. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 728 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 728 may be configured to provide voice and/or data communications with any combination of the above technologies. The network 728 may be configured to or adapted to provide voice and/or data communications in accordance with future generation technologies.

In some embodiments, the WWAN component 722 is configured to provide dual-multi-mode connectivity to the network 728. For example, the WWAN component 722 may be configured to provide connectivity to the network 728, wherein the network 728 provides service via GSM and UMTS technologies, or via some other combination of technologies. Alternatively, multiple WWAN components 722 may be utilized to perform such functionality, and/or provide additional functionality to support other non-compatible technologies (i.e., incapable of being supported by a single WWAN component). The WWAN component 722 may facilitate similar connectivity to multiple networks (e.g., a UMTS network and an LTE network).

The network 728 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN is implemented utilizing one or more wireless WI-FI access points. In some embodiments, one or more of the wireless WI-FI access points are another computing device with connectivity to a WWAN that are functioning as a WI-FI hotspot. The WLAN component 724 is configured to connect to the network 728 via the WI-FI access points. Such connections may be secured via various encryption technologies including, but not limited, WI-FI Protected Access ("WPA"), WPA2, Wired Equivalent Privacy ("WEP"), and the like.

The network 728 may be a WPAN operating in accordance with Infrared Data Association ("IrDA"), BLUETOOTH, wireless Universal Serial Bus ("USB"), Z-Wave, ZIGBEE, or some other short-range wireless technology. In some embodiments, the WPAN component 726 is configured to facilitate communications with other devices, such as peripherals, computers, or other computing devices via the WPAN.

The sensor components 708 include a magnetometer 730, an ambient light sensor 732, a proximity sensor 734, an accelerometer 736, a gyroscope 738, and a Global Positioning System sensor ("GPS sensor") 740. It is contemplated that other sensors, such as, but not limited to, temperature sensors or shock detection sensors, also may be incorporated in the computing device architecture 700.

The magnetometer 730 is configured to measure the strength and direction of a magnetic field. In some embodiments the magnetometer 730 provides measurements to a compass application program stored within one of the memory components 704 in order to provide a user with accurate directions in a frame of reference including the cardinal directions, north, south, east, and west. Similar measurements may be provided to a navigation application program that includes a compass component. Other uses of measurements obtained by the magnetometer 730 are contemplated.

The ambient light sensor 732 is configured to measure ambient light. In some embodiments, the ambient light sensor 732 provides measurements to an application program stored within one the memory components 704 in order to automatically adjust the brightness of a display (described below) to compensate for low-light and high-light environments. Other uses of measurements obtained by the ambient light sensor 732 are contemplated.

The proximity sensor 734 is configured to detect the presence of an object or thing in proximity to the computing device without direct contact. In some embodiments, the proximity sensor 734 detects the presence of a user's body (e.g., the user's face) and provides this information to an application program stored within one of the memory components 704 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 734 are contemplated.

The accelerometer 736 is configured to measure proper acceleration. In some embodiments, output from the accelerometer 736 is used by an application program as an input mechanism to control some functionality of the application program. For example, the application program may be a video game in which a character, a portion thereof, or an object is moved or otherwise manipulated in response to input received via the accelerometer 736. In some embodiments, output from the accelerometer 736 is provided to an application program for use in switching between landscape and portrait modes, calculating coordinate acceleration, or detecting a fall. Other uses of the accelerometer 736 are contemplated.

The gyroscope 738 is configured to measure and maintain orientation. In some embodiments, output from the gyroscope 738 is used by an application program as an input mechanism to control some functionality of the application program. For example, the gyroscope 738 can be used for accurate recognition of movement within a 3D environment of a video game application or some other application. In some embodiments, an application program utilizes output from the gyroscope 738 and the accelerometer 736 to enhance control of some functionality of the application program. Other uses of the gyroscope 738 are contemplated.

The GPS sensor 740 is configured to receive signals from GPS satellites for use in calculating a location. The location calculated by the GPS sensor 740 may be used by any application program that requires or benefits from location information. For example, the location calculated by the GPS sensor 740 may be used with a navigation application program to provide directions from the location to a destination or directions from the destination to the location. Moreover, the GPS sensor 740 may be used to provide location information to an external location-based service, such as E911 service. The GPS sensor 740 may obtain location information generated via WI-FI, WIMAX, and/or cellular triangulation techniques utilizing one or more of the network connectivity components 706 to aid the GPS sensor 740 in obtaining a location fix. The GPS sensor 740 may also be used in Assisted GPS ("A-GPS") systems.

The I/O components 710 include a display 742, a touchscreen 744, a data I/O interface component ("data I/O") 746, an audio I/O interface component ("audio I/O") 748, a video I/O interface component ("video I/O") 750, and a camera 752. In some embodiments, the display 742 and the touchscreen 744 are combined. In some embodiments two or more of the data I/O component 746, the audio I/O component 748, and the video I/O component 750 are combined. The I/O components 710 may include discrete processors configured to support the various interface described below, or may include processing functionality built-in to the processor 702.

The display 742 is an output device configured to present information in a visual form. In particular, the display 742 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some embodiments, the display 742 is a liquid crystal display ("LCD") utilizing any active or passive matrix technology and any backlighting technology (if used). In some embodiments, the display 742 is an organic light emitting diode ("OLED") display. Other display types are contemplated.

The touchscreen 744 is an input device configured to detect the presence and location of a touch. The touchscreen 744 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen 744 is incorporated on top of the display 742 as a transparent layer to enable a user to use one or more touches to interact with objects or other information presented on the display 742. In other embodiments, the touchscreen 744 is a touch pad incorporated on a surface of the computing device that does not include the display 742. For example, the computing device may have a touchscreen incorporated on top of the display 742 and a touch pad on a surface opposite the display 742.

In some embodiments, the touchscreen 744 is a single-touch touchscreen. In other embodiments, the touchscreen 744 is a multi-touch touchscreen. In some embodiments, the touchscreen 744 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 744. As such, a developer may create gestures that are specific to a particular application program.

In some embodiments, the touchscreen 744 supports a tap gesture in which a user taps the touchscreen 744 once on an item presented on the display 742. The tap gesture may be used for various reasons including, but not limited to, opening or launching whatever the user taps. In some embodiments, the touchscreen 744 supports a double tap gesture in which a user taps the touchscreen 744 twice on an item presented on the display 742. The double tap gesture may be used for various reasons including, but not limited to, zooming in or zooming out in stages. In some embodiments, the touchscreen 744 supports a tap and hold gesture in which a user taps the touchscreen 744 and maintains contact for at least a pre-defined time. The tap and hold gesture may be used for various reasons including, but not limited to, opening a context-specific menu.

In some embodiments, the touchscreen 744 supports a pan gesture in which a user places a finger on the touchscreen 744 and maintains contact with the touchscreen 744 while moving the finger on the touchscreen 744. This gesture also is referred to above as a touch-and-drag gesture and/or a touch-drag gesture. The pan gesture may be used for various reasons including, but not limited to, moving through screens, images, or menus at a controlled rate. Multiple finger pan gestures are also contemplated. In some embodiments, the touchscreen 744 supports a flick gesture in which a user swipes a finger in the direction the user wants the screen to move. The flick gesture may be used for various reasons including, but not limited to, scrolling horizontally or vertically through menus or pages. In some embodiments, the touchscreen 744 supports a pinch and stretch gesture in which a user makes a pinching motion with two fingers (e.g., thumb and forefinger) on the touchscreen 744 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 744. As such, the above gestures should be understood as being illustrative and should not be construed as being limiting in any way.

The data I/O interface component 746 is configured to facilitate input of data to the computing device and output of data from the computing device. In some embodiments, the data I/O interface component 746 includes a connector configured to provide wired connectivity between the computing device and a computer system, for example, for synchronization operation purposes. The connector may be a proprietary connector or a standardized connector such as USB, micro-USB, mini-USB, or the like. In some embodiments, the connector is a dock connector for docking the computing device with another device such as a docking station, audio device (e.g., a digital music player), or video device.

The audio I/O interface component 748 is configured to provide audio input and/or output capabilities to the computing device. In some embodiments, the audio I/O interface component 746 includes a microphone configured to collect audio signals. In some embodiments, the audio I/O interface component 746 includes a headphone jack configured to provide connectivity for headphones or other external speakers. In some embodiments, the audio interface component 748 includes a speaker for the output of audio signals. In some embodiments, the audio I/O interface component 746 includes an optical audio cable out.

The video I/O interface component 750 is configured to provide video input and/or output capabilities to the computing device. In some embodiments, the video I/O interface component 750 includes a video connector configured to receive video as input from another device (e.g., a video media player such as a DVD or BLURAY player) or send video as output to another device (e.g., a monitor, a television, or some other external display). In some embodiments, the video I/O interface component 750 includes a High-Definition Multimedia Interface ("HDMI"), mini-HDMI, micro-HDMI, DisplayPort, or proprietary connector to input/output video content. In some embodiments, the video I/O interface component 750 or portions thereof is combined with the audio I/O interface component 748 or portions thereof.

The camera 752 can be configured to capture still images and/or video. The camera 752 may utilize a charge coupled device ("CCD") or a complementary metal oxide semiconductor ("CMOS") image sensor to capture images. In some embodiments, the camera 752 includes a flash to aid in taking pictures in low-light environments. Settings for the camera 752 may be implemented as hardware or software buttons.

Although not illustrated, one or more hardware buttons may also be included in the computing device architecture 700. The hardware buttons may be used for controlling some operational aspect of the computing device. The hardware buttons may be dedicated buttons or multi-use buttons. The hardware buttons may be mechanical or sensor-based.

The illustrated power components 712 include one or more batteries 754, which can be connected to a battery gauge 756. The batteries 754 may be rechargeable or disposable. Rechargeable battery types include, but are not limited to, lithium polymer, lithium ion, nickel cadmium, and nickel metal hydride. Each of the batteries 754 may be made of one or more cells.

The battery gauge 756 can be configured to measure battery parameters such as current, voltage, and temperature. In some embodiments, the battery gauge 756 is configured to measure the effect of a battery's discharge rate, temperature, age and other factors to predict remaining life within a certain percentage of error. In some embodiments, the battery gauge 756 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 712 may also include a power connector, which may be combined with one or more of the aforementioned I/O components 710. The power components 712 may interface with an external power system or charging equipment via a power I/O component 744.

Based on the foregoing, it should be appreciated that technologies for progressive loading for web-based spreadsheet applications have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for displaying data corresponding to a web-based spreadsheet, the computer-implemented method comprising performing computer-implemented operations of:

determining a viewport size of a viewport corresponding to a viewable portion of the web-based spreadsheet;

determining a predicted change to the viewport;

determining, based at least in part on the predicted change to the viewport, a window size of a window corresponding to a portion of the web-based spreadsheet adjacent to the viewport;

determining a preloaded area corresponding to a further portion of the webbased spreadsheet adjacent to the window;

determining if a cache cleaning process is to be executed at a computer based upon a number of rendered views of data generated;

cleaning the cache, in response to determining that the cache cleaning process is to be executed, wherein the cache cleaning process comprises identifying an oldest portion of the data stored in the cache and deleting the oldest portion of the data from the cache;

obtaining data from a data storage device corresponding to the viewport and the window and rendering the data corresponding to the viewport and the window for displaying;

obtaining data from the data storage device corresponding to the preloaded area and storing the data corresponding to the preloaded area for rendering, the rendering of the data corresponding to the preloaded area performed in response to a change to the viewport;

storing the data in the cache associated with the computer; and displaying the viewport at the computer.

2. The method of claim 1, further comprising determining if input for moving the viewport is detected at the computer.

3. The method of claim 2, wherein displaying the viewport comprises displaying the viewport on a touch-sensitive display associated with the computer, and wherein determining if the input is detected comprises determining if a touch gesture corresponding to a pan command is detected at the computer.

4. The method of claim 2, further comprising determining if data associated with a moved viewport exists in the cache in response to determining that the input is detected, the moved viewport comprising a portion of the spreadsheet to which the viewport is moved.

5. The method of claim 4, further comprising displaying the moved viewport, in response to determining that the data associated with the moved viewport exists in the cache.

6. The method of claim 5, wherein the portion of the spreadsheet to which the viewport is moved comprises at least a portion of the window or the preloaded area.

7. The method of claim 5, further, in response to determining that the data associated with the moved viewport does not exist in the cache:

determining a new window size of a new window corresponding to a portion of the spreadsheet adjacent to the moved viewport;

determining a new preloaded area corresponding to a further portion of the spreadsheet adjacent to the new window; and obtaining new data from the data storage device corresponding to the moved viewport, the new window, and the new preloaded area.

8. The method of claim 7, wherein the data storage device comprises a server computer executing a web-based spreadsheet application.

9. The method of claim 1, wherein determining the window size of the window comprises determining, based upon the viewport size, the window size.

10. The method of claim 1, wherein obtaining the data from the data storage device comprises:

determining the viewport size and the window size at runtime execution of an application program used to render the viewport;

providing the viewport size and the window size to the data storage device; and receiving hypertext markup language elements from the data storage device, the hypertext markup language elements being generated at the data storage device and comprising data associated with the viewport and the window.

11. The method of claim 1, wherein storing the data corresponding to the preloaded area for rendering includes storing the data in the cache; and rendering of the data corresponding to the preloaded area performed in response to a change to the viewport is performed using the data stored in the cache without downloading data from a data storage device external to the computer.

12. A computer storage medium having computer readable instructions stored thereupon that, when executed by a computer, cause the computer to:

receive, at the computer, a request for data corresponding to a spreadsheet;

determine, during runtime execution of an application program used to render the spreadsheet at the computer, a viewport size of a viewport corresponding to a portion of the web-based spreadsheet viewable at the computer;

determine a window size of a window corresponding to a portion of the spreadsheet adjacent to the viewport based at least partially upon the viewport size and one or more of a user setting, an application setting, a heuristic, or a predicted change to the viewport;

determine, based at least partially upon the window size, a preloaded area corresponding to a portion of the spreadsheet comprising cells adjacent to the window;

determine if a cache cleaning process is to be executed at the computer based upon a number of rendered views of data generated;

clean the cache, in response to determining that the cache cleaning process is to be executed, wherein the cache cleaning process comprises identifying an oldest portion of the data stored in the cache and deleting the oldest portion of the data from the cache;

obtain the data from a server computer executing a spreadsheet application, the data corresponding to contents of the viewport, the window, and the preloaded area;

store the data in the cache associated with the computer, wherein the portion of the data corresponding to contents of the preloaded area is stored for rendering in response to a change in the viewport; and display the viewport at the computer.

13. The computer storage medium of claim 12, wherein the window size is proportional to the viewport size and the preloaded area comprises each cell that borders the window.

14. The computer storage medium of claim 13, wherein obtaining the data from the server computer comprises:

determine a range of cells associated with the window;

request the range of cells from the server computer;

obtain the range of cells from the server computer; and store the range of cells in the cache.

15. The computer storage medium of claim 12, further comprising computer readable instructions that, when executed by the computer, cause the computer to:

determine if input for moving the viewport is detected at the computer;

in response to determining that the input is detected, determine if data associated with a moved viewport is stored in the cache, the moved viewport comprising a portion of the spreadsheet to which the viewport is moved;

display the moved viewport, in response to determining that the data associated with the moved viewport is stored in the cache;

obtain the data associated with the moved viewport from the server computer, in response to determining that the data associated with the moved viewport is not stored in the cache; and display the moved viewport at the computer.

16. The computer storage medium of claim 12, wherein the instructions include instructions to render the data corresponding to the preloaded area in response to a change to the viewport by use of the data stored in the cache without downloading data from a data storage device external to the computer.

17. A system, comprising:

a computer comprising:

one or more processors; and memory communicatively coupled to the one or more processors, the memory storing instructions that, when executed by the one or more processors, cause the computer to:

determine, during runtime execution of an application program used to render a spreadsheet at the computer, a viewport size of a viewport corresponding to a portion of the spreadsheet viewable at the computer;

predict a change to the viewport;

determine, based at least partially upon the viewport size and the change to the viewport, a window size of a window corresponding to a portion of the spreadsheet adjacent to the viewport wherein the window size is proportional to the viewport size;

determine, based at least partially upon the window size, a preloaded area corresponding to a portion of the spreadsheet adjacent to the window, wherein the preloaded area includes each cell that borders the window;

determine a first range of cells associated with the window and a second range of cells associated with the preloaded area;

determine if a cache cleaning process is to be executed at the computer based upon a number of rendered views of data generated;

clean the cache, in response to determining that the cache cleaning process is to be executed, wherein the cache cleaning process comprises identifying an oldest portion of the data stored in the cache and deleting the oldest portion of the data from the cache;

obtain data corresponding to at least a portion of the spreadsheet from a server computer executing a spreadsheet application, a portion of the data corresponding to the first range of cells and a portion of the data corresponding to the second range of cells;

store the data in the cache associated with the computer;

display the viewport at the computer;

receive a command to move the viewport; and render for display at least a portion of the second range of cells in response to receiving the command.

18. The system of claim 17, wherein the computer is further configured to:

in response to the command to move the viewport, determine if data associated with a moved viewport is stored in the cache, the moved viewport comprising a portion of the spreadsheet to which the viewport is moved;

display the moved viewport, in response to determining that the data associated with the moved viewport is stored in the cache;

obtain the data associated with the moved viewport from the server computer, in response to determining that the data associated with the moved viewport is not stored in the cache; and display the moved viewport at the computer.

19. The system of claim 17, wherein the cache cleaning process comprises identifying an oldest portion of the data stored in the cache and deleting the oldest portion of the data from the cache.

20. The system of claim 17, wherein the instructions further cause the computer to:

determine a range of cells associated with the window;

request the range of cells from the server computer;

obtain the range of cells from the server computer; and store the range of cells in the cache.

21. The system of claim 17, wherein the instructions include instructions to render the data corresponding to the second range of cells in response to a change to the viewport by use of the data stored in the cache without downloading data from a data storage device external to the computer.

* * * * *